United States Patent
Russell et al.

(10) Patent No.: US 9,613,338 B1
(45) Date of Patent: *Apr. 4, 2017

(54) READING STATION STRUCTURES

(71) Applicant: Amazon Technologies, Inc., Seattle, WA (US)

(72) Inventors: Ryan Scott Russell, Bellevue, WA (US); Thomas Matthew Ryle, Olympia, WA (US); Wesley Scott Lauka, Seattle, WA (US); Jonathan David Phillips, Seattle, WA (US); James Hollis Wood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,360

(22) Filed: Jun. 13, 2016

Related U.S. Application Data

(63) Continuation of application No. 14/558,603, filed on Dec. 2, 2014, now Pat. No. 9,400,971.

(51) Int. Cl.
*G06Q 10/08* (2012.01)
*G06K 7/10* (2006.01)
*G06K 19/077* (2006.01)

(52) U.S. Cl.
CPC ....... *G06Q 10/087* (2013.01); *G06K 7/10356* (2013.01); *G06K 19/07758* (2013.01)

(58) Field of Classification Search
CPC .................. G06Q 10/087; G06K 7/10356
See application file for complete search history.

(56) References Cited

U.S. PATENT DOCUMENTS

| | | | |
|---|---|---|---|
| 6,652,213 B1 | 11/2003 | Mitchell et al. | |
| 7,155,304 B1 | 12/2006 | Charych et al. | |
| 8,022,809 B2 | 9/2011 | Flores et al. | |
| 8,280,547 B2 | 10/2012 | D'Andrea et al. | |
| 9,378,484 B1 | 6/2016 | Russell et al. | |
| 9,400,971 B1 * | 7/2016 | Russell et al. ....... | G06Q 10/087 235/385 |
| 2003/0227392 A1 | 12/2003 | Ebert et al. | |
| 2005/0156035 A1 | 7/2005 | Gyi et al. | |

(Continued)

OTHER PUBLICATIONS

Finishing Touch Mitter : Tunnel Car Wash Equipment. [online] Hanna, 2013. [Retrieved on Dec. 2, 2014] http://www.hannacarwash.com/index.php/2008/06/25/finishing-touch-mitter, 3 pages.

(Continued)

*Primary Examiner* — Kristy A Haupt
(74) *Attorney, Agent, or Firm* — Kilpatrick Townsend & Stockton LLP

(57) ABSTRACT

In some examples, a reader system is provided for managing inventory items in an inventory system. The reader system may be configured to read tags associated with items stowed in an inventory holder. The inventory holder may be detachably coupled to a mobile drive unit. The mobile drive unit may move the inventory holder to a first position near an antenna of the reader system and the tags may begin to be read. While reading or at other times in the reading process, the mobile drive unit may move the inventory holder relative to the antenna. The identified tags may be compared to a manifest list of items expected to be stowed in the inventory holder.

20 Claims, 16 Drawing Sheets

(56) References Cited

U.S. PATENT DOCUMENTS

| | | |
|---|---|---|
| 2006/0058913 A1 | 3/2006 | Andersen et al. |
| 2006/0131405 A1 | 6/2006 | Schneider et al. |
| 2006/0255948 A1 | 11/2006 | Runyon et al. |
| 2010/0292877 A1 | 11/2010 | Lee et al. |
| 2012/0126000 A1 | 5/2012 | Kunzig et al. |
| 2012/0143427 A1 | 6/2012 | Hoffman et al. |
| 2012/0328395 A1 | 12/2012 | Jacobsen et al. |
| 2014/0084060 A1 | 3/2014 | Jain et al. |
| 2014/0167919 A1 | 6/2014 | Singh et al. |
| 2014/0167920 A1 | 6/2014 | Kamiya |
| 2014/0247116 A1 | 9/2014 | Davidson et al. |

OTHER PUBLICATIONS

Retail Case Study: American Apparel. [online] Impinj, May 2013. [Retrieved on Dec. 2, 2014] http://resources.impinj.com/h/l/10330092-retail-case-study-american-apparel, 6 pages.

RFID Technology Boosts Walmart's Supply Chain Management. [online] University Alliance, University of San Francisco, 2014 [Retrieved on Dec. 2, 2014] available online at http://www.usanfranonline.com/resources/supply-chain-management/rfidtechnology-boosts-walmarts-supply-chain-management/#.U-FH8VbB-wg> 2014, 4 pages.

U.S. Appl. No. 14/558,603 , "Non-Final Office Action", Nov. 27, 2015, 12 pages.

U.S. Appl. No. 14/558,603 , "Notice of Allowance", Apr. 6, 2016, 7 pages.

U.S. Appl. No. 15/184,952, filed Jun. 16, 2016, Titled: Management of Inventory Items.

\* cited by examiner

READING STATION STRUCTURES

CROSS-REFERENCE TO RELATED APPLICATION

This application is a continuation of U.S. patent application Ser. No. 14/558,603, filed on Dec. 2, 2014, and entitled "READING STATION STRUCTURES," which is incorporated herein by reference in its entirety.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, as modern inventory systems continue to increase in size and complexity, the likelihood that some inventory items will become lost within the inventory systems increases. These items may be lost as they are transferred into the inventory systems, as they move throughout the inventory systems, or as they move out of the inventory systems. Lost inventory items may impact operating budgets associated with these inventory systems and may also affect efficiency.

BRIEF DESCRIPTION OF THE DRAWINGS

Various embodiments in accordance with the present disclosure will be described with reference to the drawings, in which.

DETAILED DESCRIPTION

Figure 1:
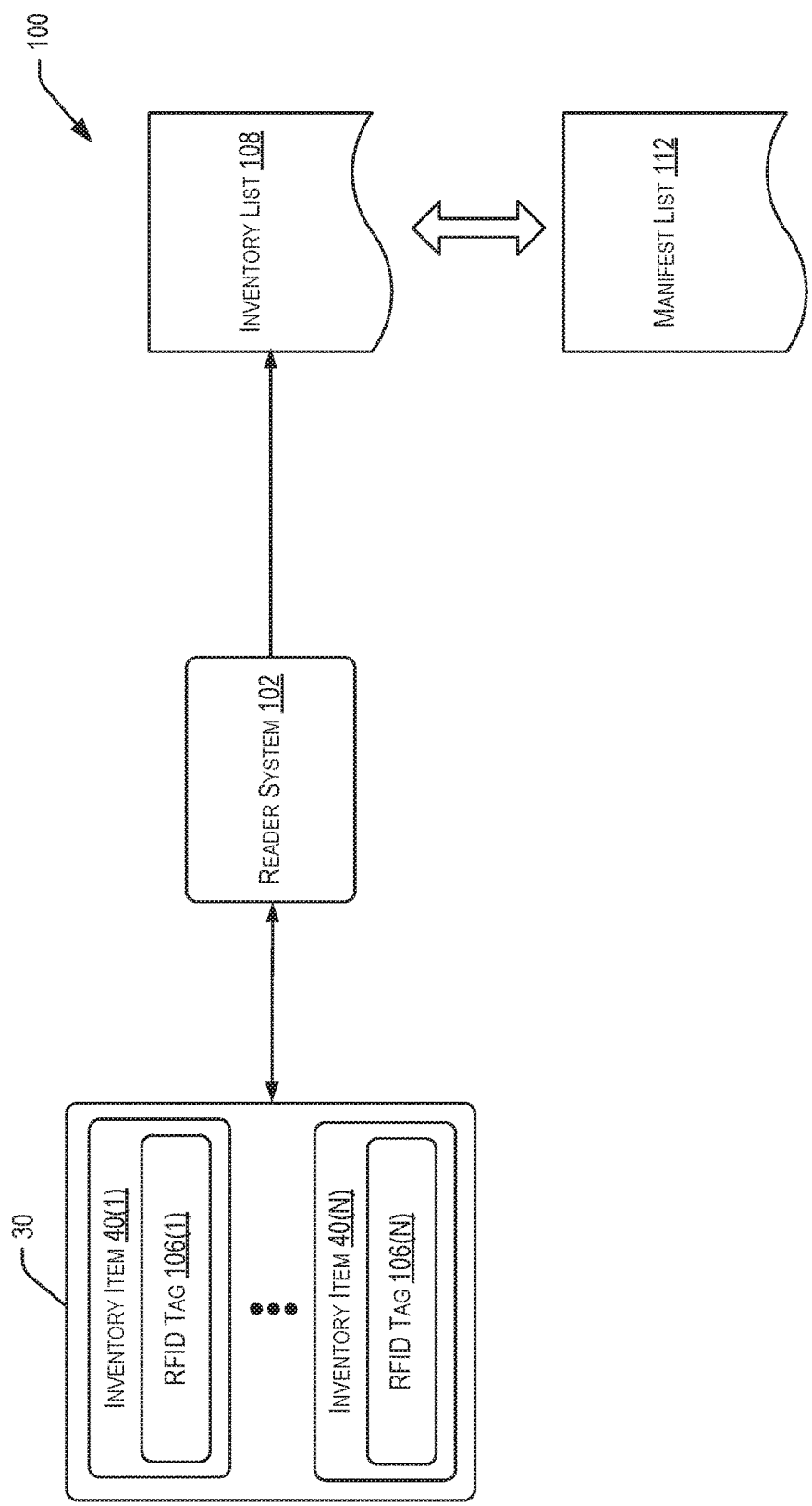
FIG. 1 illustrates an example block diagram depicting techniques relating to managing inventory items using radio-frequency identification (RFID) tags as described herein, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to managing inventory items of an inventory system using radio-frequency identification (RFID) tags. To this end, RFID tags may be attached to individual inventory items as they move throughout the inventory systems. An individual RFID tag may uniquely identify an individual inventory item because a number associated with the RFID tag may be entirely unique. To read the RFID tags (and identify the corresponding inventory items) a reader system may be provided. In some examples, the reader system includes one or more antennas attached to a reading structure. The reading structure may take a variety of shapes. The reader system may be configured to communicate with the RFID tags via the one or more antennas. Such communication may include determining the unique numbers associated with the RFID tags.

In some examples, inventory items, including their corresponding RFID tags, may move throughout an inventory system within different compartments of the inventory holders. The inventory holders may be coupled to mobile drive units, which can move the inventory holders between different locations of a workspace where inventory items are stored and processed. In some examples, the mobile drive units may be autonomous. In accordance with techniques described herein, the inventory items stowed within inventory holders may be identified by reading the RFID tags attached to the inventory items. The likelihood of reading all of the items within an inventory holder may increase when the RFID tags are exposed to the one or more antennas at different angles. This may be because many inventory items (including corresponding RFID tags) are packed together tightly within a particular inventory holder. Accordingly, techniques described herein may include moving the inventory holder in a manner that exposes the RFID tags to the one or more antennas at different angles.

In one example, as items enter a warehouse they are each tagged with an RFID tag and recorded in a manifest. The pairing of RFID tags to items is typically one-to-one. These items are then loaded into an inventory holder. As each item is loaded, the manifest is updated that associates the items (by their RFID tags) with the inventory holder (identified by an inventory holder RFID tag). The manifest identifies which items are expected to be within the inventory holder and is managed by an inventory management system. Next, a mobile drive unit moves the inventory holder, loaded with the items, from location to location within the warehouse. Occasionally, the mobile drive unit will be instructed to take the inventory holder to a reading station. The reading station is a location within the warehouse where the items within the inventory holder can be counted, identified, and compared to the manifest. As the inventory holder enters the reading station (by the mobile drive unit), the inventory holder is identified by a reader system (including one or more antennas fixed in the direction of the inventory holder) reading the inventory holder RFID tag. Next, the reading station begins to read the RFID tags to identify the items associated with the RFID tags. As the reading station is reading the RFID tags, the mobile drive unit is instructed to move the inventory holder to expose the different sides of the inventory holder to the antennas. This may involve the mobile drive unit rotating the inventory holder or moving it in a fixed or arbitrary pattern. Such movement and/or rotation manipulates the locations and/or orientations of the items relative to the antennas and increases the probability that all items will be identified. The reader system continues to read the RFID tags until some threshold is reached (e.g., a period of time (e.g., 45 seconds) a percentage of the total RFID tags are read (e.g., 95%), and other similar thresholds), or until the mobile drive unit is instructed to otherwise leave the reading station. Once some of the items are identified (e.g., after their RFID tags have been read), these items can be compared to the items from the manifest. Because the manifest indicates which items are expected to be in the inventory holder, this comparison reveals whether the threshold relating to percentage of identified items has been reached, indicates lost or unread items, and also serves as an inventory check. Once reading is complete, the mobile drive unit is instructed to move the inventory holder out of the reading station.

In another example, a reading station is provided as part of an inventory system. At the reading station is located a reading structure for reading RFID tags associated with items in an inventory holder. While a variety of different reading structures are described herein, a particular reading structure includes two upright poles. On each pole, an antenna to read the RFID tags is attached. The poles are placed wide enough apart that a mobile drive unit carrying an inventory holder can pass between the two poles. The two antennas face each other on the two opposing poles. In this manner, the two antennas can transmit radio frequency signals toward the same location (i.e., the middle area between the two poles) but from different directions. As the mobile drive unit moves the inventory holder within the range of the antennas, the antennas begin to read the RFID tags. The data collected from reading the RFID tags may be processed by a reader system managing the two antennas, provided to an inventory management system, or otherwise processed, transmitted and/or stored. At some time during the reading, the mobile drive unit is instructed to move the inventory holder to expose the different sides of the inventory holder to the antennas. This may involve the mobile drive unit rotating the inventory holder between the two poles or moving it in a fixed or arbitrary pattern. Such movement and/or rotation manipulates the locations of the items and increases the probability that all items will be identified.

Generally, RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present description.

In addition to RFID tags which are automatically coupled with an RFID reader, the systems and methods of the present description may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

Turning now to the figures, FIG. 1 illustrates an example block diagram 100 depicting techniques relating to managing inventory items using RFID tags as described herein. The block diagram 100 may include an inventory holder 30. As detailed herein, the inventory holder 30 may include a plurality of compartments in which inventory items, such as inventory items 40(1)-40(N) may be stowed. The inventory holder 30 may also include an inventory holder RFID tag for its own identification. The inventory holder 30 may be cable of being coupled to a mobile drive unit (not shown) to move the inventory holder 30 within a workspace.

The block diagram 100 may also include a reader system 102 that is configured to transmit radio frequency (RF) energy in the form of RF signals (e.g., an interrogator signal) and receive RF energy in the form of RF signals (e.g., authentication replies). The reader system 102 may transmit the interrogator signal in the direction of the inventory holder 30 via an antenna (not shown). The interrogator signal may energize RFID tags 106(1)-106(N) attached to the inventory items 40(1)-40(N) stowed within the inventory holder 30. The RFID tags 106(1)-106(N) may be any suitable RFID tag capable of transmitting stored data (e.g., a unique tag ID number), and may therefore include an integrated circuit and an antenna.

The unique tag ID may be an electronic product code including a suitable number of bits of data (e.g., 96 bits) that may be used to identify the particular inventory item 40 associated with the RFID tag 106 and may also be used to identify other objects, organizations, and the like. In some examples, the RFID tags 106(1)-106(N) may be passive tags, active tags, or any combination of passive and active (e.g., semi-active).

Once the RFID tag 106(1) is energized it may begin to transmit its own RF energy (e.g., an authentication reply). As the reader system 102 is configured to receive RF energy, it may receive the authentication reply from the RFID tag 106(1). The process of the reader system 102 sending an interrogation signal and receiving authentication replies from tags may be characterized as "reading tags." Thus, by reading the RFID tag 106(1), the reader system may have sufficient information to identify the inventory item 40(1); and, in particular, to identify that the inventory item 40(1) is stowed within the inventory holder 30. Once the inventory item 40(1) is identified, an indication that it has been identified may be added to an inventory list 108, which may then be compared to a manifest list 112. The manifest list 112 may include a list of items expected to be stowed in the inventory holder 30 and other inventory holders within the workspace.

In some examples, reading the RFID tag 106(N) may prove difficult. This may be because the inventory item 40(N) to which the RFID tag 106(N) is attached may be stacked in the inventory holder 30 below other inventory items. Other reasons for difficulty may include: the inventory item 40(N) may have been placed near the middle of the inventory holder 30 or the RFID tag 106(N) may have been attached to the inventory item 40(N) in a manner that makes reading the RFID tag 106(N) difficult. In accordance with reading techniques described herein, the position of the inventory holder 30 may be moved (by the mobile drive unit) relative to the antenna of the reader system 102. This may include rotating the inventory holder 30 to expose different sides of the inventory holder 30 (and therefore different sides of the inventory item 40(N)) to the antenna and many other movements described herein. Such movement may enable the reader system 102 to read the RFID tag 106(N) and identify the inventory item 40(N). Similar to the above, once the inventory item 40(N) is identified, an indication that it has been identified may be added to the inventory list 108. In some examples, the inventory list 108 may be populated with items shortly after a particular RFID tag is read, periodically while tags are being read (e.g., every five seconds), after tags have been read for some fixed period of time (e.g., one minute), and/or according to other suitable conventions.

Figure 2:
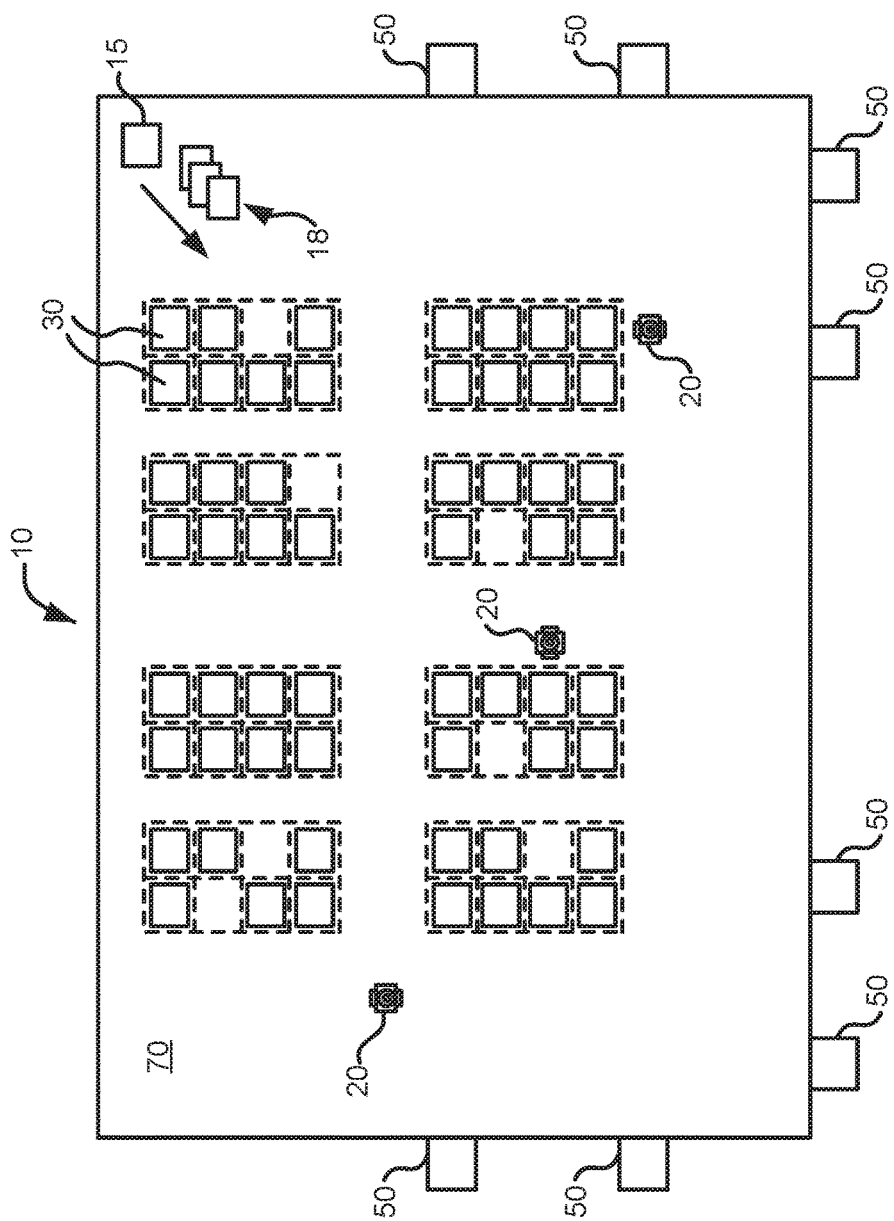
FIG. 2 illustrates components of an inventory system according to at least one embodiment.

FIG. 2 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

In particular embodiments, more or less inventory stations 50 may be included in the inventory system 10. For example, when inventory station 50 is used as a reading station equipped with the appropriate hardware to read RFID tags (e.g., reader system 102, including a reader, one or more antennas, etc.), there may be fewer inventory stations 50. Thus, at the inventory stations 50, in this embodiment, the RFID tags 106 associated with the inventory items 40 stowed in the inventory holders 30 may be read. In some examples, the inventory stations 50 may include reading structures configured to receive the inventory holders 30 and read the RFID tags 106. For example, as detailed herein, the reading structures may include two or more upright poles with fixed antennas, an upside down u-shaped structure similar to a door frame with fixed antennas, a drive-through structure with antennas fixed within, a dome structure with antennas fixed within, a frame with a plurality of flexible antennas extending below the frame towards the floor of the workspace 70, a frame with a plurality of oscillating flexible antennas extending below the frame towards the floor of the workspace 70, and other similar structures.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
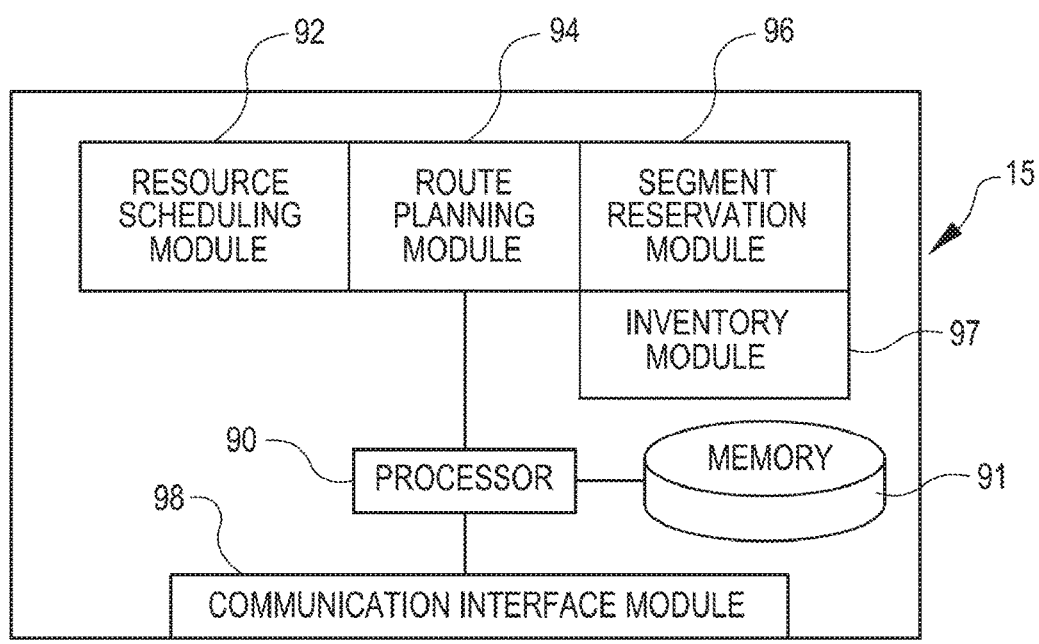
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
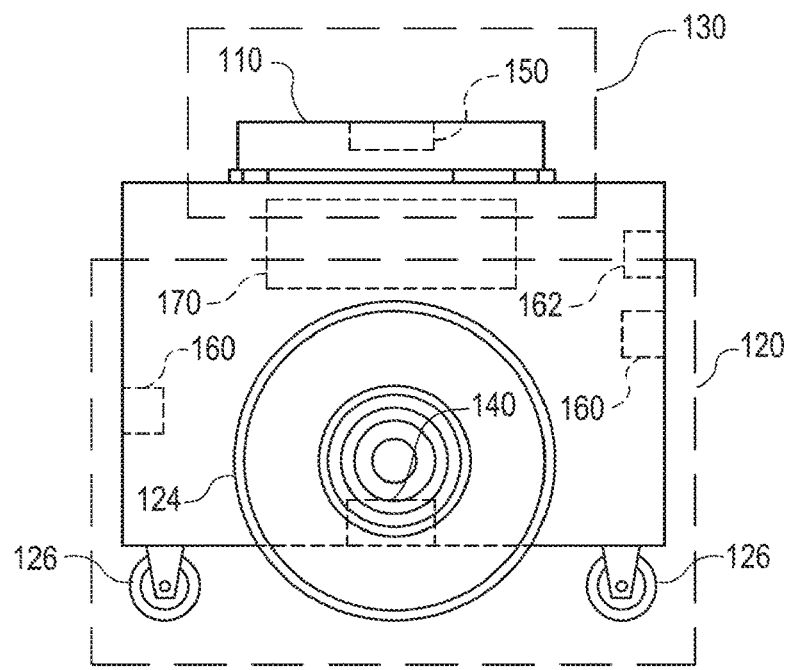
FIGS. 4 and 5 illustrate in greater detail an example mobile drive unit that may be utilized in particular embodiments of the inventory system shown in FIG. 2.
Figure 5:
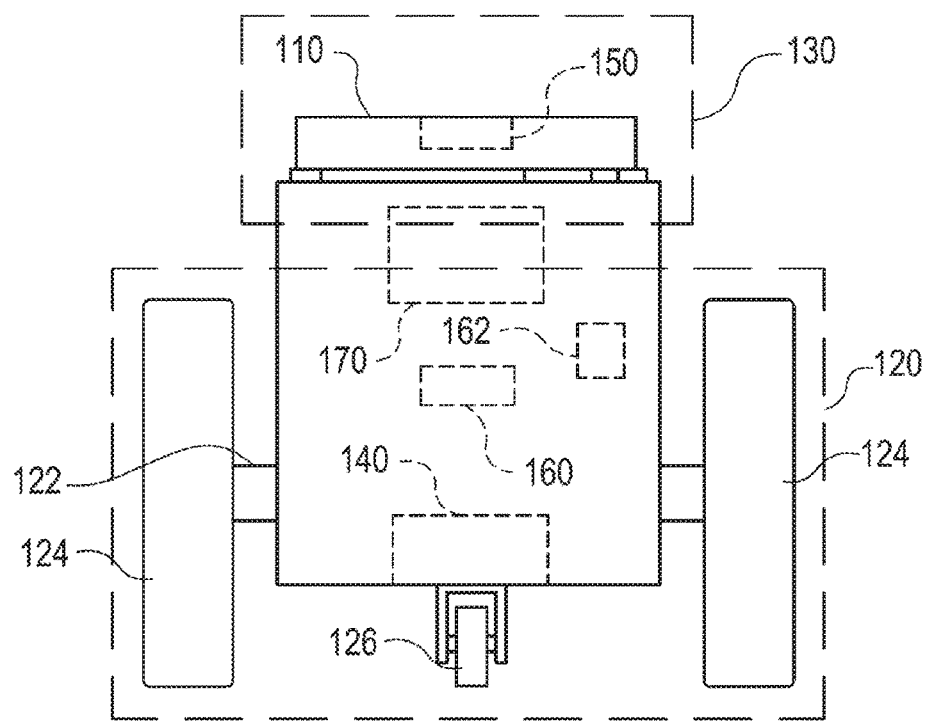

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
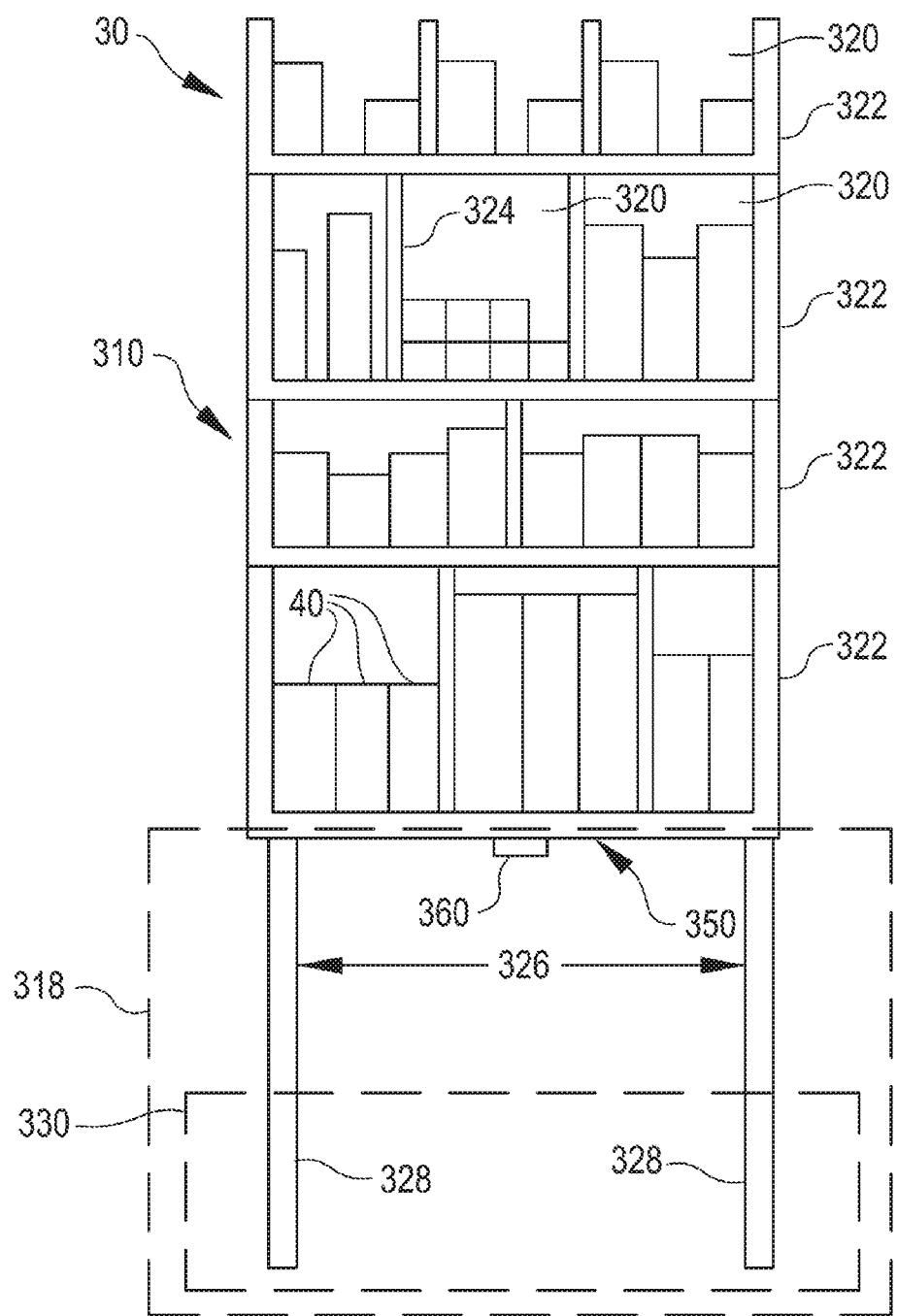
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks 450. Mobile drive unit 20 may be configured to detect fiducial marks 450 and to determine the location of mobile drive unit 20 and/or measure its movement based on the detection of fiducial marks 450.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As introduced above, embodiments herein are directed to an inventory system having multiple inventory holders and drive units for moving the inventory holders. Specifically, features herein are directed to managing inventory items of an inventory system using RFID tags.

Figure 7:
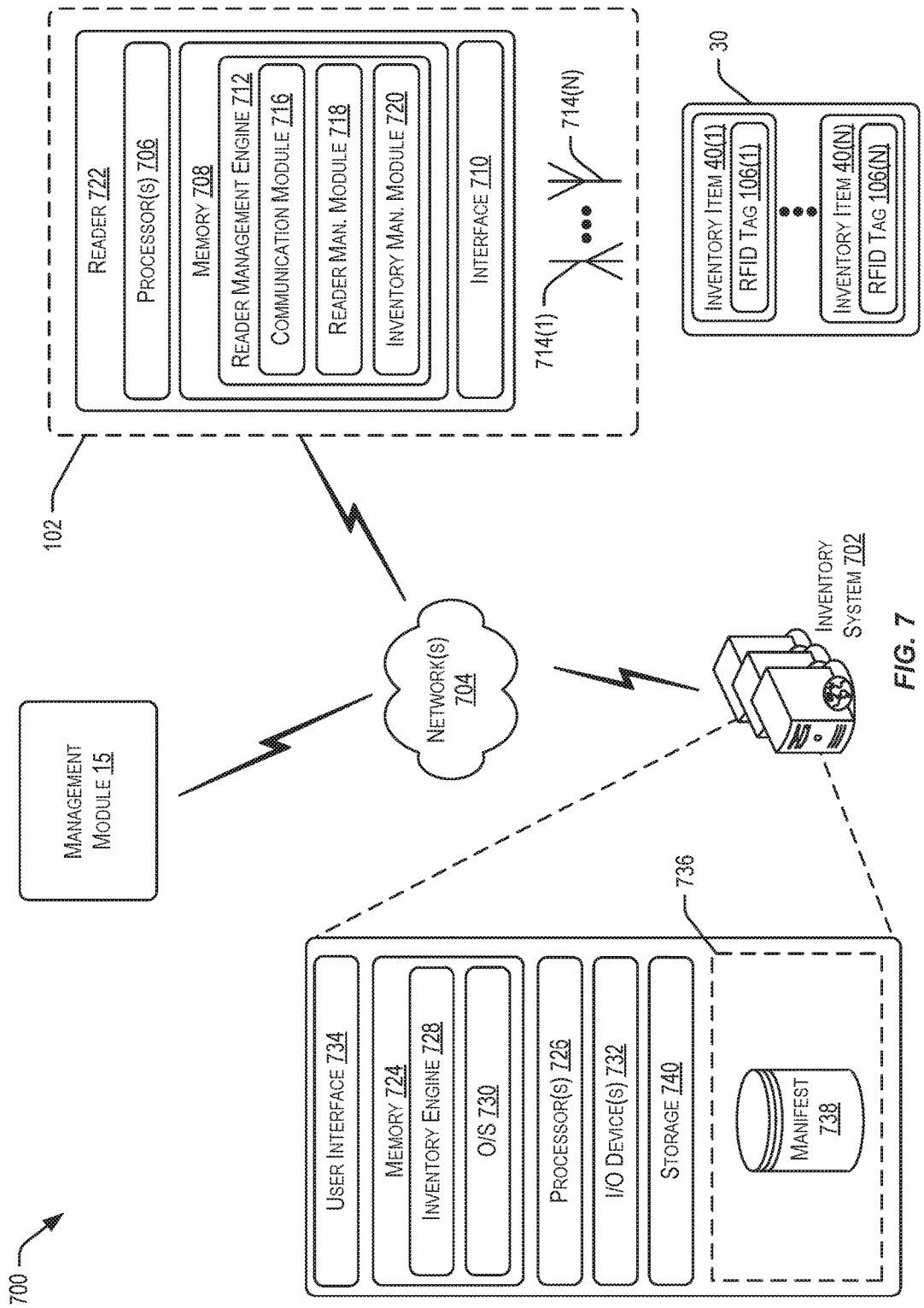
FIG. 7 illustrates an example schematic architecture for implementing techniques relating to managing inventory items using RFID tags as described herein, according to at least one embodiment.

In FIG. 7 is illustrated an example schematic architecture 700 for implementing techniques relating to managing inventory items using RFID tags as described herein. The architecture 700 may include the management module 15, the reader system 102, and an inventory management system 702 in communication with each other via one or more network(s) 704. The architecture 700 may be implemented as part of implementing the inventory system 10. Thus, the inventory system 10 includes the management module 15, in the architecture 700, the inventory system 10 may also include the reader system 102 and the inventory management system 702.

As discussed above, the management module 15 may be configured to manage the movement and operation of the mobile drive units 20. The reader system 102 may be configured to manage the reading of the RFID tags 106 attached to the inventory items 40 stowed within the inventory holder 30. To this end, the reader system 102 may be any suitable RF reader system capable of reading RFID tags. In some examples, the reader system 102 may be an active reader passive tag system. In other examples, the reader system 102 may be a passive reader active tag system, an active reader active tag system, or any other suitable reader system and tag combination. The reader system 102 may be configured to read tags using any suitable frequency band, including low frequency bands, high frequency bands, ultra-high frequency bands, microwave bands, and any other suitable frequency bands.

The reader system 102 may include reader 722. The reader 722 may include one or more computers, servers, or the like. Accordingly, the reader 722 may include one or more processors 706, memory 708, and an interface 710. The processors 706 may include one or more general purpose computers, dedicated microprocessors, or other processing devices capable of communicating electronic information. Examples of the processor 706 include one or more application-specific integrated circuits (ASICs), field programmable gate arrays (FPGAs), digital signal processors (DSPs) and any other suitable specific or general purpose processors. Computer-executable instruction, software or firmware implementations of the processor 706 may include computer-executable or machine-executable instructions written in any suitable programming language to perform the various functions described. Thus, the processor 706 may be configured to access the one or more applications, engines, modules, or components of the memory 708 to perform the techniques described herein.

The memory 708 may include more than one memory and may be distributed. The memory 708 may store program instructions (e.g., reader management module 712) that are loadable and executable on the processor 706, as well as data generated during the execution of these programs. Depending on the configuration and type of memory including the reader 722, the memory 708 may be volatile (such as random access memory (RAM)) and/or non-volatile (such as read-only memory (ROM), flash memory, or other memory). Within the memory 708 may be stored unique tag IDs associated with the RFID tags 106. Thus, after a particular RFID tag 106 has been read, identifying information for that RFID tag may be retained in the memory 708 prior to being provided to the inventory management system 702.

Figure 8:
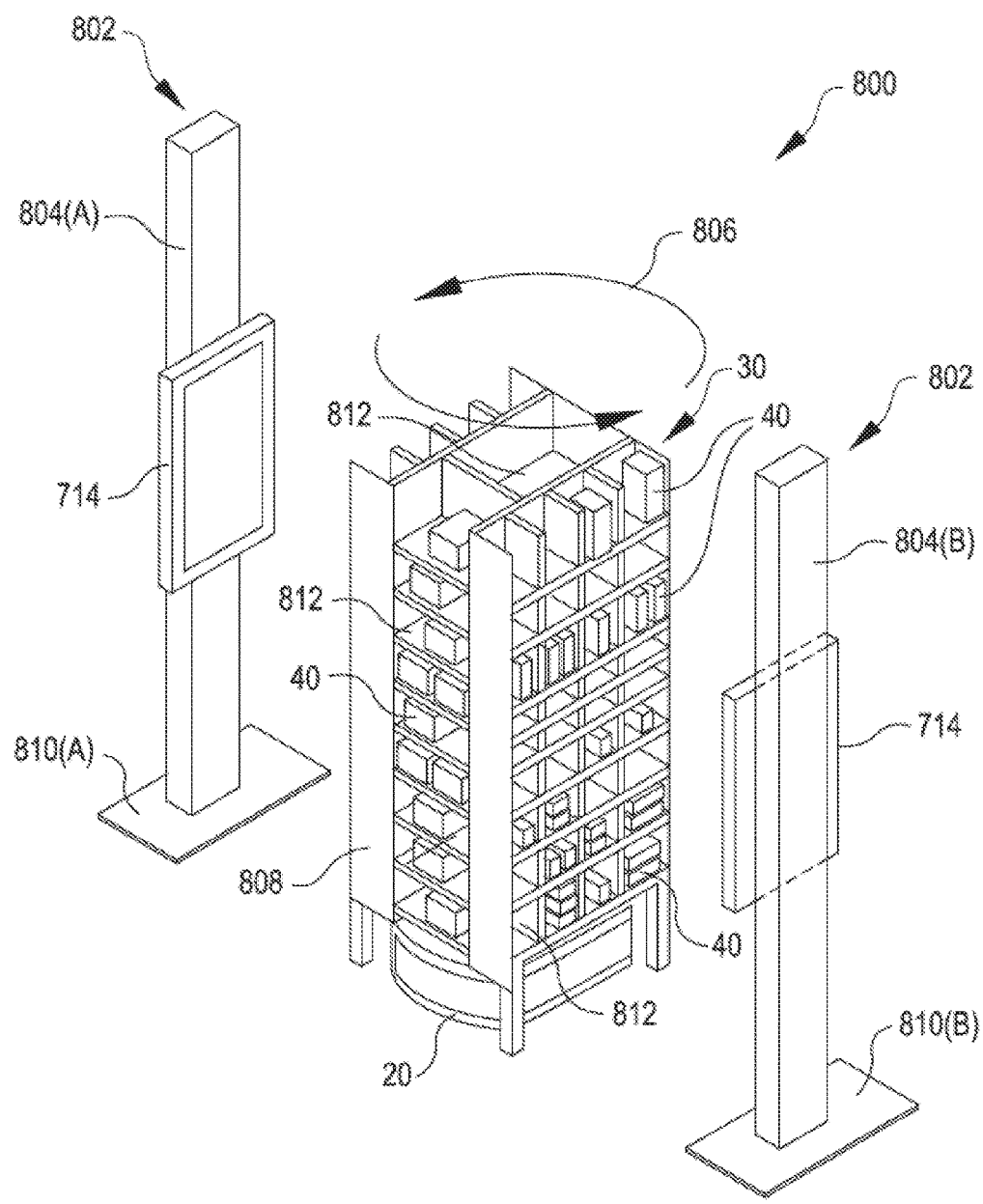
FIG. 8 illustrates an example reading structure for implementing techniques relating to managing inventory items using RFID tags as described herein, according to at least one embodiment.

The interface 710 of the reader 722 may comprise one or more interfaces, each of which may be configured to receive inputs and provide outputs relating to reading RFID tags. For example, the interface 710 may be an antenna interface capable of connecting antennas 714(1)-714(N) to the reader system 102. Thus, the interface 710 may enable the reader 722 to communicate with the RFID tags 106 via the antennas 714. The antennas 714 may be any suitable antennas configured to transmit and receive RF energy. In FIG. 8 (and other figures) are illustrated example configurations for mounting the antennas 714.

The reader management module 712 may be configured to manage one or more sub-modules, components, and/or services directed to examples disclosed herein. In some examples, the reader management module 712 may include a communication module 716, a reader management module 718, and an inventory management module 720. While these modules will be described as performing discrete tasks with reference to the flow charts, it is understood that FIG. 7 illustrates example configurations and other configurations performing other tasks and/or similar tasks as those described herein may be implemented according to the techniques described herein. In some examples, the reader management module 712 may be implemented, as appropriate, in hardware or software.

The communication module 712 may be configured to receive requests from other components of the architecture 700 and communicate responses to other components of the architecture 700. For example, the communication module 716 may receive and evaluate a request to read the inventory holder 30. The request may come from the inventory management system 702 and/or the management module 15. In some examples, the communication module 716 may provide inventory information to the inventory management system 702. Such inventory information may include indications of the RFID tags 106 (or other RFID tags (e.g., an inventory holder RFID tag) that have been identified by the reader system 102. In some examples, the inventory information may be provided to the inventory management system 702 in real-time or substantially real-time. In some examples, the inventory information may be provided to the inventory management system 702 periodically, in accordance with a threshold, and in other suitable ways.

The reader management module 718 may be configured to manage the transmission of RF energy via the antennas 714 and the collection of RF energy via the antennas 714. For example, the reader management module 718 may determine when to turn on and when to turn off the reader 722 and/or the antennas 714. The reader management module 718 may determine the unique tag IDs for each of the RFID tags 106 read by the reader 722. In some examples, the reader management module 718 may be configured to read and suppress RFID tags. For example, after the reader management module 718 has read the RFID tag 106(1), the reader management module 718 may suppress the RFID tag 106(1) in order to focus on the other RFID tags (e.g., 106(2)-106(N). In this manner, the reader 722 may focus its search for RFID tags. The reader management module 718 may also manage signal conversion of the signals received via the antennas 714.

The inventory management module 720 may be configured to determine inventory information based on the RFID tags 106 collected by the reader system 102. For example, the inventory management module 720 may compile the unique tag IDs into a list and provide the list to the communication module 716 to provide to the inventory management system 702. In some examples, the inventory management module 720 may compare the inventory information with a manifest received from the inventory management system 702. In this manner, the reader system 102 may operate autonomously or partially autonomously from the inventory management system 702.

The inventory management system 702 may include one or more computers, perhaps arranged in a cluster of servers or as a server farm. The memory and processors that make up these computers may be located within one computer or distributed throughout many computers as detailed herein. These servers may be configured to manage inventory of the inventory system 10 and other systems. For example, the inventory management system 702 may be configured to manage inventory for an electronic marketplace. In this example, the inventory management system 702 may manage inventory while it is located at variety of different locations (e.g., warehouses, shipping centers, and other locations). This may also involve end-to-end tracking of inventory. In some examples, the reader system 102 may enable the inventory management system 702 to more effectively manage the inventory of a particular warehouse or multiple warehouses.

The inventory management system 702 may include at least one memory 724 and one or more processing units (or processor(s)) 726. The processor 726 may be implemented as appropriate in hardware, computer-executable instructions, software, firmware, or combinations thereof. Computer-executable instruction, software or firmware implementations of the processor 726 may include computer-executable or machine-executable instructions written in any suitable programming language to perform the various functions described. The memory 724 may include more than one memory and may be distributed throughout the inventory management system 702. The memory 724 may store program instructions (e.g., inventory engine 728) that are loadable and executable on the processor(s) 726, as well as data generated during the execution of these programs. Depending on the configuration and type of memory included the inventory management system 702, the memory 724 may be volatile (such as random access memory (RAM)) and/or non-volatile (such as read-only memory (ROM), flash memory, or other memory). The inventory management system 702 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some examples, the memory 724 may include multiple different types of memory, such as static random access memory (SRAM), dynamic random access memory (DRAM), or ROM. The memory 724 may include an operating system 730 and one or more application programs, modules, or services for implementing the features disclosed herein including at least the inventory engine 728.

In some examples, the inventory management system 702 may also include additional storage 740, which may include removable storage and/or non-removable storage. The additional storage 740 may include, but is not limited to, magnetic storage, optical disks, and/or tape storage. The disk drives and their associated computer-readable media may provide non-volatile storage of computer-readable instructions, data structures, program modules, and other data for the computing devices. The memory 724 and the additional storage 740, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture 700. The inventory management system 702 may also include input/output (I/O) device(s) and/or ports 732, such as for enabling connection with a keyboard, a mouse, a pen, a voice input device, a touch input device, a display, speakers, a printer, or other I/O device.

In some examples, the inventory management system 702 may also include a user interface 734. The user interface 734 may be utilized by an operator, or other authorized user to access portions of the inventory management system 702. In some examples, the user interface 734 may include a graphical user interface, web-based applications, programmatic interfaces such as application programming interfaces (APIs), or other user interface configurations. The inventory management system 702 may also include a data store 736. In some examples, the data store 736 may include one or more data stores, databases, data structures, or the like for storing and/or retaining information associated with the inventory management system 702. Thus, the data store 736 may include data structures, such as the manifest data store 738.

The manifest data store 738 may be used to retain manifests or lists of items within the inventory system 10. In some examples, a manifest may include a list of items expected to be stowed within a particular inventory holder 30. For example, as an inventory item 40 is received into the inventory system 10, it may be tagged with an RFID tag 106. Within the manifest the RFID tag 106 and the corresponding inventory item 40 may be associated. For example, the manifest may include a table that may include the unique tag ID identifying the RFID tag 106, a product identification code identifying the inventory item 40 (e.g., a universal product code (UPC), a European article number (EAN), an international standard book number (ISB), an Amazon standard identification number (ASIN), or the like), and any other suitable information and/or characteristics to identify the inventory item 40. This table may be retained within the manifest data store 738. This table may be accessed by the inventory engine 728 to perform the techniques described herein. In some examples, a portion of the manifest may be provided to the reader system 102 to perform the techniques described herein.

Finally, the network 704 can include any appropriate network, including an intranet, the Internet, a cellular network, a local area network or any other such network or combination thereof. Components used for the architecture 700 may depend at least in part upon the type of network and/or environment selected. The network 704 may be proprietary or non-proprietary.

FIG. 8 illustrates an example reading station 800 for implementing techniques relating to managing inventory items using RFID tags as described herein. Other example reading stations will be discussed with reference to FIGS. 12-17. The reading station 800 is introduced at this point in the specification to provide context for the discussion of the later flow charts.

In some examples, the reading station 800 (and any other reading station discussed herein) may be located at the inventory station 50 previously discussed. The reading station 800 (and any other reading station discussed herein) may also be located at another location within the workspace 70. Irrespective of where the reading station 800 (or any other reading station discussed herein) is located, the reading station 800 (or any other reading station discussed herein) may be used to implement techniques relating to managing inventory using RFID tags.

The reading station 800 includes a reading structure 802 and may receive the inventory holder 30 within or near the reading structure 802. The reading structure 802 may include one or more elongated members 804(A), 804(B). The elongated members 804 may be disposed adjacent to each other, and, in some examples, may be directly opposite each other. The elongated members 804 may be attached to foot areas 810(A), 810(B). The foot areas 810 may be configured to provide support to the elongated members 804. The reading structure 802 may also include one or more antennas 714 attached to each of the elongated members 804. While one antenna 714 is shown attached to one elongated member 804, it is understood that more than one antenna 714 may be provided on each elongated member 804. It is also understood that more than two elongated members 804 may be provided. In some examples, it may be desirable that the antennas 714 are aligned in different directions to maximize the amount of RF energy that may be provided in the direction of the inventory holder 30. The antennas 714 may be included in the reader system 102 and may therefore be in communication with the reader 722 via one or more wired connections, wireless connections, and any combination of both. The reader 722 (not shown) may be located at the reading station 800 or at a remote location.

The inventory holder 30 is illustrated as including a plurality of compartments 812 and inventory items 40 stowed in some of the plurality of compartments 812. The inventory holder 30 may be constructed of any suitable material that may be permeable by RF energy. For example, the inventory holder 30 may be constructed of fabric, plastic, cardboard, webbing and the like. In some examples, the inventory holder 30 may include a frame 808 with fabric, plastic, webbing, or cardboard attached to the frame 808. In this manner, the RF energy may be unobstructed as it moves between the compartments 812 to read the tags 106 attached to the inventory items 40. In some examples, the frame 808 may be constructed of metal or some other rigid material. The inventory holder 30 may have a rectangular or cubicle shape. In some examples, the inventory holder 30 may have a cylindrical, triangular, trapezoidal, or any other suitable shape.

As illustrated in the FIG. 8, the inventory holder 30 is shown coupled to the mobile drive unit 20. Because the mobile drive unit 20 is coupled to the inventory holder 30, the mobile drive unit 20 may be configured to move the inventory holder 30. For example, the mobile drive unit 20 may rotate (as indicated by arrows 806) the inventory holder 30 in order to expose the different sides of the inventory holder 30 to the antennas 714. The reader 102 may then interrogate the RFID tags 106 attached to the inventory items 40 stowed in all of the different compartments 812.

The techniques described herein may be implemented in accordance with the following examples. An isolated reading station may be provided and mobile drive units 20 may move the inventory holders 30 to the reading station in accordance with some scheduling rule, which may be user-defined, learned, and/or estimated. For example, the scheduling rule may indicate that each time an inventory item 40 is picked from the inventory holder 30, the inventory holder 30 should be read. In some examples, the scheduling rule may indicate that the inventory holder 30 should be read at least one time per day, each time it passes the reading station, before and/or after any particular tasks or operations, etc.

Once the mobile drive unit 20 moves the inventory holder 30 into the reading station the inventory holder 30 may be identified, e.g., via a RFID tag on the inventory holder 30. Next, a manifest may be identified from the inventory system 702 based on the identified inventory holder 30. The RFID tags 106 within inventory holder 30 may then be read by one or more readers via one or more antennas. While the tags are being read, the mobile drive unit 20 may spin the inventory holder 30 in place for a fixed period of time (e.g., one minute) in accordance with a fall-off curve, or according to any other convention. Meanwhile the inventory items 40 corresponding to the RFID tags 106 that have been read may be compared with items from the manifest. Later, the mobile drive unit 20 may move the inventory holder 30 out of the reading station. In some examples, the comparing may reveal that certain inventory items 40 are missing from the inventory holder 30. These missing inventory items 40 may be recorded and considered the next time the inventory holder 30 is read. In some examples, if one of the inventory items 40 is not identified after one or more readings, the reader system 102 and/or the inventory system 702 may generate a report. The report may be provided to schedule human intervention. For example, the report may be used by a human user to investigate the inventory holder 30 to look for the missing inventory item. In some examples, the report may identify the inventory holder 30, its location within the inventory system 10, details about the missing item (e.g., product identification code), and/or where the RFID tag 106 was placed on the missing item, which may be determined from one or more placement rules enforced at inventory item intake.

Figure 9:
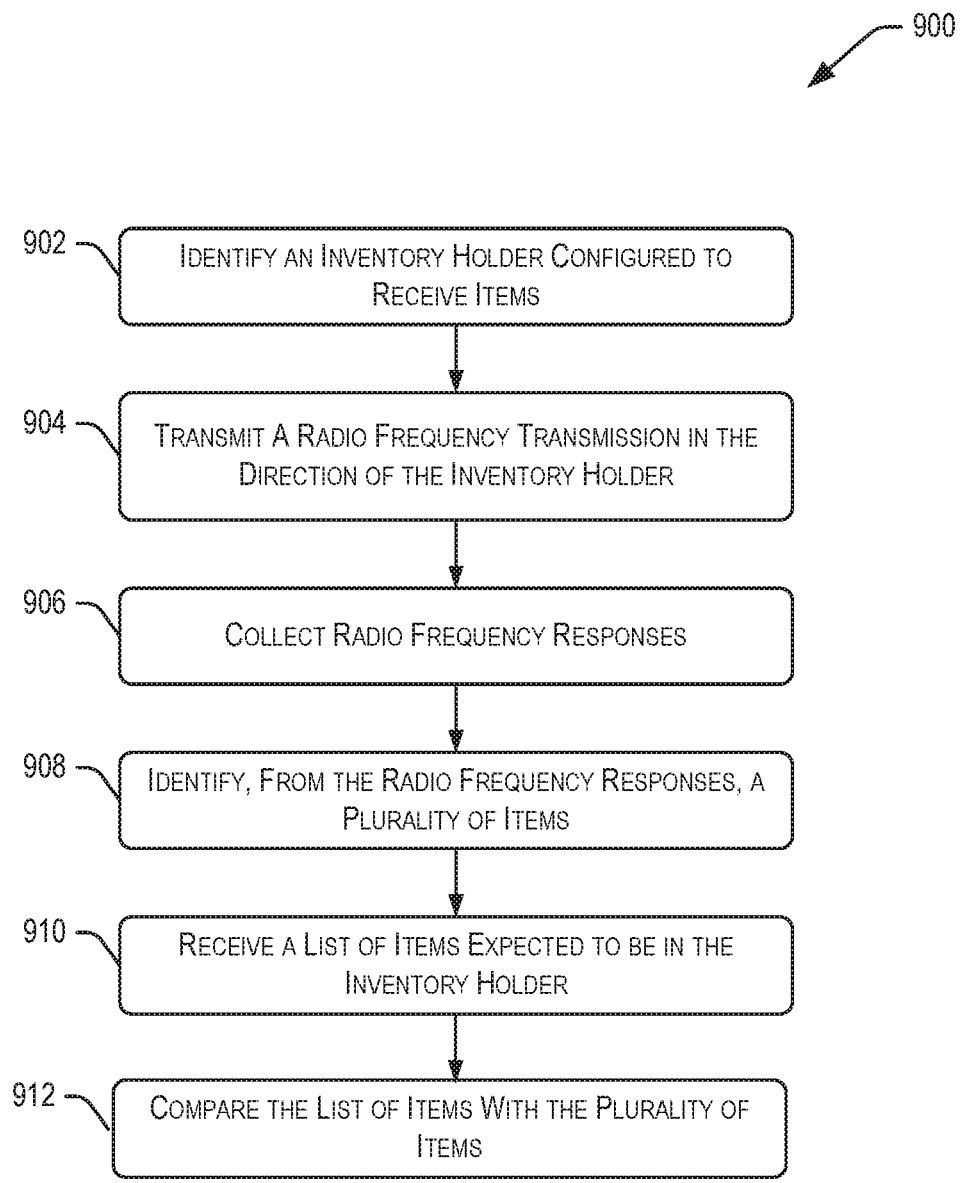
FIG. 9 illustrates a flow diagram depicting example acts for implementing techniques relating to managing inventory items using RFID tags as described herein, according to at least one embodiment.

FIG. 9 depicts process 900 including example acts and/or procedures relating to managing inventory items using RFID tags in accordance with at least one example. Some or all of the process 900 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The reader system 102 (FIG. 7) may perform the process 900 of FIG. 9. The process 900 begins at 902 by identifying an inventory holder configured to receive items. In some examples, identifying the inventory holder configured to receive the items may be performed by the reader management module 718 (FIG. 7). Identifying the inventory holder may include instructing the reader 722 to read an inventory holder RFID tag associated with the inventory holder. In some examples, the inventory holder RFID tag may be any conventional RFID tag and may be attached to the inventory holder. In some examples, identifying the inventory holder may include identifying the inventory holder in some manner other than reading an RFID tag associated with the inventory holder, e.g., by scanning or image recognition of a barcode or other identifier.

At 904, the process 900 transmits a radio frequency transmission in the direction of the inventory holder. In some examples, transmitting the radio frequency transmission in the direction of the inventory holder may be performed by the reader management module 718. Transmitting the radio frequency transmission may include providing an interrogation signal via one or more antennas. In some examples, the radio frequency transmission may be transmitted in other directions in addition to the direction of the inventory holder.

At 906, the process 900 collects radio frequency responses. In some examples, collecting the radio frequency responses may be performed by reader management module 718. Collecting the radio frequency responses may include collecting, by a reader, radio frequency responses in response to the radio frequency transmission contacting one or more RFID tags. In some examples, such contact may energize the one or more RFID tags and cause the RFID tags to provide authentication replies.

At 908, the process 900 identifies, from the radio frequency responses, a plurality of items. In some examples, identifying the plurality of items may be performed by the reader system 102 and/or the inventory management module 720 (FIG. 7). Identifying the plurality of items may include identifying inventory items stowed in compartments of the inventory holder. In some examples, identifying inventory items may involve resolving the collected RFID tags to determine with which items the RFID tags are associated. In some examples, identifying the plurality of items includes identifying at least a portion of the items while a mobile drive unit rotates the inventory holder relative to the one or more antennas. In some examples, the mobile drive unit moves the inventory holder according to a pattern (e.g., a figure eight) that may be user-defined, arbitrary, or learned. Moving the inventory holder may expose different sides of the inventory holder to the one or more antennas, and may also expose different sides of the inventory items (and therefore the RFID tags) to the one or more antennas. In this manner, the capability to read all RFID tags within the moving inventory holder may increase over a stationary inventory holder. In some examples, the amount of RF energy transmitted in the direction of the inventory holder may be so concentrated, that spinning, rotating, and any other movement may be unnecessary. For example, in certain examples discussed herein, high identification rates (e.g., greater than 95%) may be achieved with little to no movement within the reading structure.

At 910, the process 900 receives a list of items expected to be in the inventory holder. Receiving the list of items expected to be in the inventory holder may be performed by the communication module 716 (FIG. 7). Receiving the list may include receiving a manifest including the list from an inventory system. In some examples, the manifest may have been previously developed as inventory items were added to the inventory system.

At 912, the process 900 compares the list of items with the plurality of items. In some examples, comparing the list of items with the plurality of items may be performed by the reader system 102 and/or the inventory management module 720. Comparing the list of items may include comparing the list of items in accordance with a confidence threshold. For example, the confidence threshold may indicate when the collecting of radio frequency responses should stop and/or when the mobile drive unit should stop moving (e.g., rotating) the inventory holder. In some examples, the confidence threshold may indicate a confidence level or confidence range. The confidence threshold may therefore indicate how confident the reader system is that it has identified all of possible inventory items. For example, a confidence level of 100% may indicate that every inventory item from the manifest was identified as being in the inventory holder. In the same vein, if the manifest indicates that 100 inventory items should be stowed in the inventory holder, and 85 inventory items are identified (by reading 85 tags), the confidence level may be 85%. In some examples, the confidence level and/or confidence threshold may correspond to a fall-off curve. For example, as a read time increases (i.e., the total time that a reader is interrogating tags), the number of identified tags over time may increase, level off, then begin to fall. Thus, even though the reader may continue to interrogate tags, the fall-off curve may indicate that it is going to take too much time (according to some standard) to identify any more tags. Thus, the reader may be instructed to stop interrogating tags and/or the mobile drive unit may be instructed to move the inventory holder away from the reading station. In some examples, the confidence level may increase each time the inventory holder is read.

Figure 10:
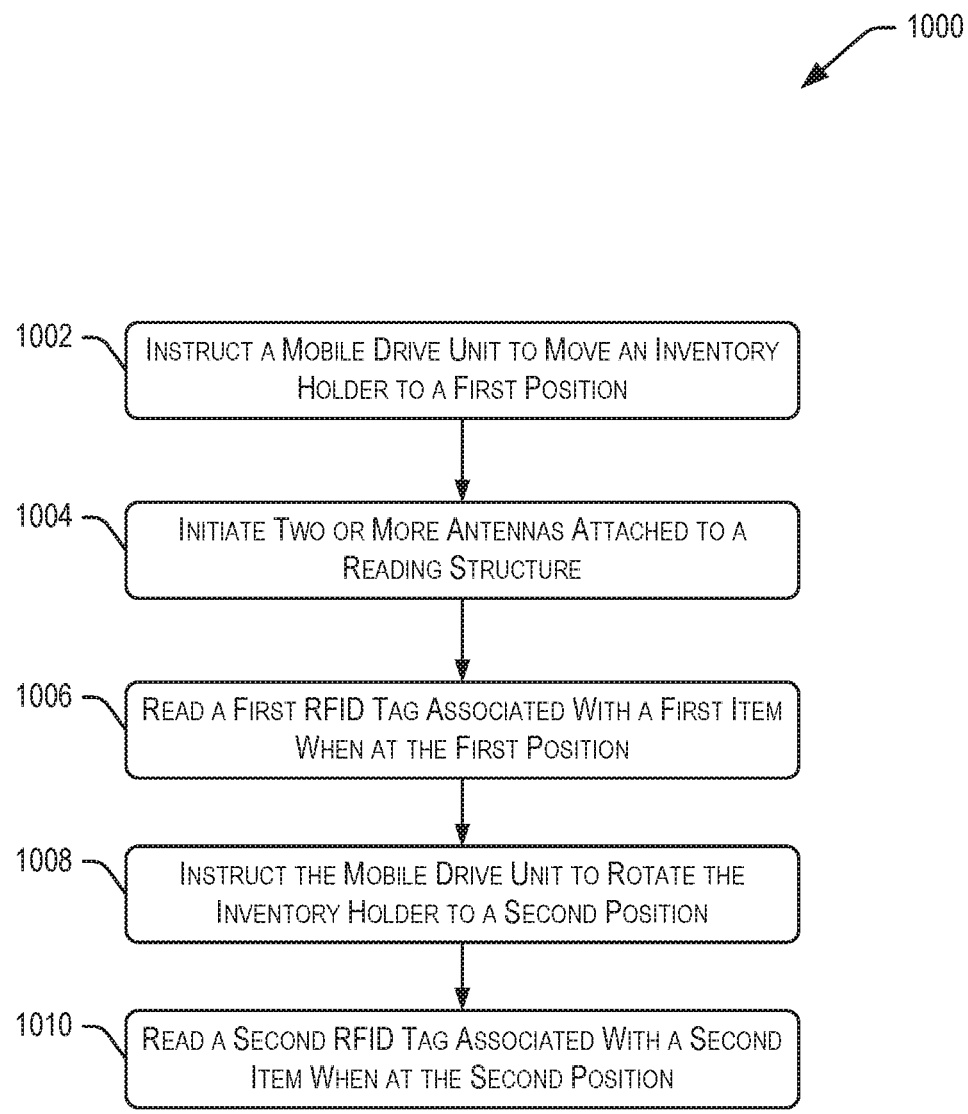
FIG. 10 illustrates a flow diagram depicting example acts for implementing techniques relating to managing inventory items using RFID tags as described herein, according to at least one embodiment.

FIG. 10 depicts process 1000 including example acts and/or procedures relating to reading RFID tags at a reading station in accordance with at least one example. Any of the reader system 102 (FIG. 7), including the reader 722 (FIG. 7), the management module 15 (FIG. 1), the inventory system 702 (FIG. 7), or a combination of the foregoing may perform the process 1000 of FIG. 10 at a reading station. In some examples, the process 1000 is performed by one of the components previously-listed. The process 1000 begins at 1002 by instructing a mobile drive unit to move an inventory holder to a first position. In some examples, instructing the mobile drive unit to move the inventory holder to the first position may be performed by the management module 15. Instructing the mobile drive unit may include instructing the mobile drive unit to couple to the inventory holder and move the inventory holder to the first position near a reading station configured to read RFID tags attached to items stowed in the inventory holder. In some examples, the first position may be located within a reading structure, which may include a structure, frame, enclosure, or the like.

At 1004, the process 1000 initiates two or more antennas attached to a reading structure. In some examples, initiating the two or more antennas attached to the reading structure may be performed by the reader system 102. Initiating the two or more antennas may include sending a turn on signal to the two or more antennas. In some examples, the two or more antennas are attached to the reading structure in a manner suitable for reading the RFID tags. In some examples, the two or more antennas may be attached at opposite angles. In some examples, the two or more antennas may be rotatable and/or adjustable. In some examples, the antennas may be included in a rotatable device configured to rotate around the inventory holder to read the RFID tags. In some examples, the two or more antennas may be any suitable antennas including linear polarized antennas, monostatic circular antennas, bistatic circular antennas, or any combination of the antennas just described.

At 1006, the process 1000 reads a first RFID tag associated with a first item when at the first position. In some examples, reading the first RFID tag associated with the first item when at the first position may be performed by the reader system 102. Reading the first RFID tag may include reading the first RFID tag when the inventory holder is located at the first position. In some examples, the inventory holder may be in motion while at the first position. In some examples, the inventory holder may be rotating while at the first position. In some examples, more tags than the first RFID tag may be read while at the first position.

At 1008, the process 1000 instructs the mobile drive unit to rotate the inventory holder to a second position. In some examples, instructing the mobile drive unit to rotate the inventory holder to the second position may be performed by the management module 15. Instructing the mobile drive unit may include instructing the mobile drive unit to rotate the inventory holder around an axis substantially parallel to the height of the inventory holder and substantially orthogonal to a surface on which the mobile drive unit is moving. In some examples, the mobile drive unit may rotate the inventory holder around some other axis of rotation (e.g., around one of the two or more antennas).

At 1010, the process 1000 reads a second RFID tag associated with a second item when at the second position. In some examples, reading the second RFID tag associated with the second item when at the second position may be performed by the reader system 102. Reading the second RFID tag may include reading when the inventory holder is located at the second position. In some examples, more tags than the second RFID tag may be read while at the second position.

Figure 11:
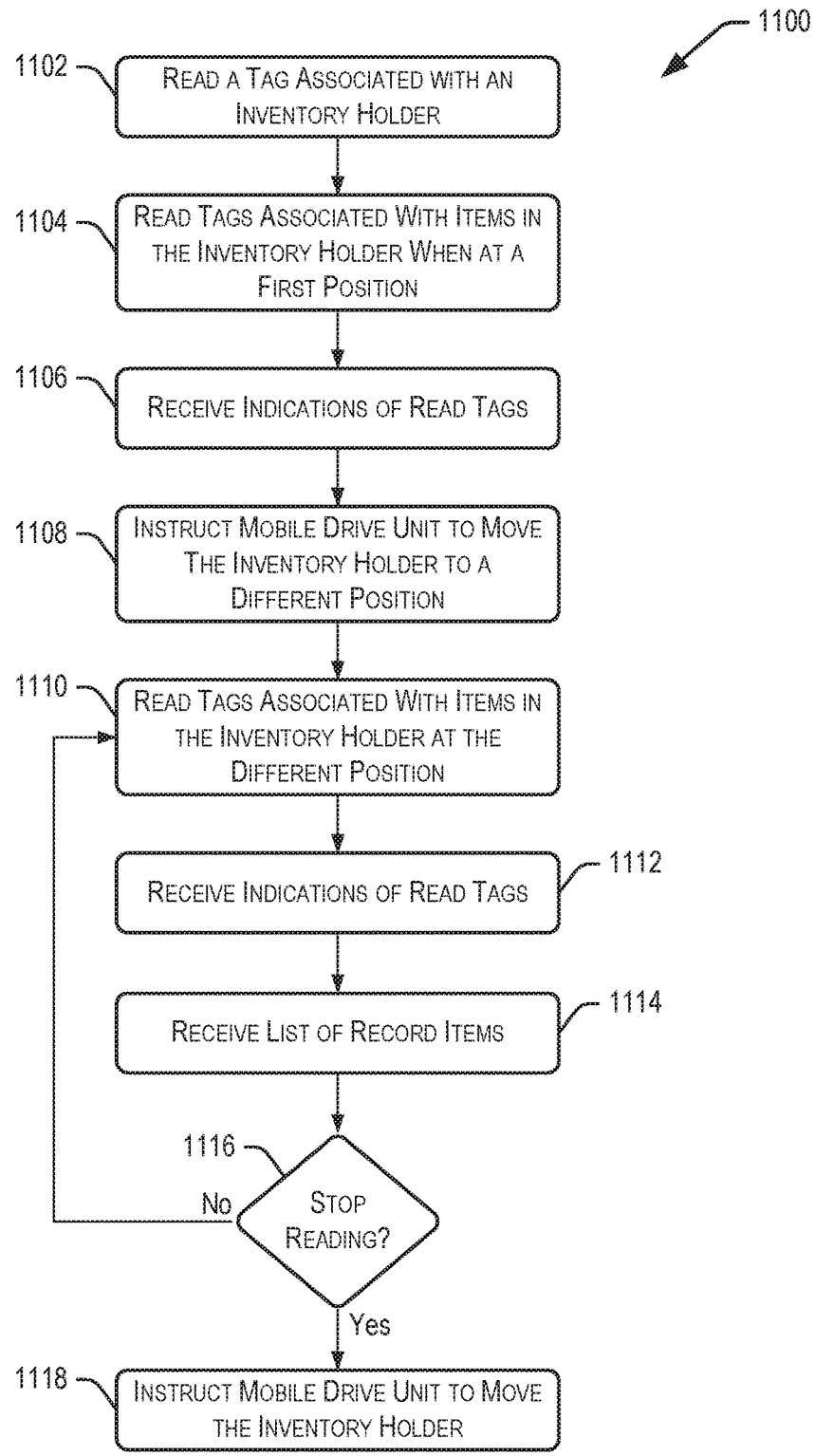
FIG. 11 illustrates a flow diagram depicting example acts for implementing techniques relating to managing inventory items using RFID tags as described herein, according to at least one embodiment.

FIG. 11 depicts process 1100 including example acts and/or procedures relating to managing inventory items using RFID tags in accordance with at least one example. Any of the reader system 102 (FIG. 7), including the reader 722 (FIG. 7), the management module 15 (FIG. 1), the inventory system 702 (FIG. 7), or a combination of the foregoing may perform the process 1100 of FIG. 11 at a reading station. In some examples, the process 1100 is performed by one of the components previously-listed. The process 1100 begins at 1102 by reading a tag associated with an inventory holder. In some examples, reading the tag associated with the inventory holder may be performed by the reader system 102. Reading the tag associated inventory holder may include reading an inventory holder tag at a reading station, as the inventory holder enters the reading station, or at any other suitable time and location.

At 1104, the process 1100 reads tags associated with items in the inventory holder when at a first position. In some examples, reading tags associated with items in the inventory holder when at the first position may be performed by the reader system 102. Reading the tags may include energizing the tags using a RF signal transmission. In some examples, the first position may be at or near a reading station which includes a reading structure and one or more antennas.

At 1106, the process 1100 receives indications of read tags. In some examples, receiving the indications of the read tags may be performed by the reader system 102. Receiving the indications of the read tags may include receiving responses from the tags in response to the RF signal transmission. Such indications may be associated with inventory information and may be included in an inventory list.

At 1108, the process 1100 instructs a mobile drive unit to move the inventory holder to a different position. In some examples, instructing the mobile drive unit to move the inventory holder to the different position may be performed by the management module 15. Instructing the mobile drive unit may include instructing the mobile drive unit to rotate or otherwise move the inventory holder. In some examples, the indications of read tags received at 1106 may inform how the process 1100 instructs the mobile drive unit to move the inventory holder at 1108. For example, at 1108, from the tags read at 1106, the process may determine whether movement would enable more tags to be read. Such movement may be appropriate after some tags have been read at 1106, but others still remain unread (i.e., have not yet been identified). The process 1100 may therefore decide when to move the inventory holder (via the mobile drive unit) based on the reading of tags.

At 1110, the process 1100 reads tags associated with items in the inventory holder when at the different position. In some examples, reading the tags associated with the items in the inventory holder when at the different position may be performed by the reader system 102. Reading the tags may include reading the tags when inventory holder is oriented differently relative the reading structure compared to when the inventory holder was at the first position.

At 1112, the process 1100 receives indications of read tags. In some examples, receiving the indications of the read tags may be performed by the reader system 102. Receiving the indications of the read tags may include receiving responses from the tags in response to the RF signal transmission. Such indications may be associated with inventory information and may be included in the inventory list.

At 1114, the process 1100 receives a list of record items. In some examples, receiving the list of record items may be performed by the inventory system 702 or may be performed by the reader system 102. Receiving the list of record items may include receiving a manifest including the list of record items. In some examples, the list of record items may indicate items that are expected to be stowed within the inventory holder.

At 1116, a decision is made whether to stop reading. In some examples, determining whether to stop reading may be performed by the reader system 102 and/or the inventory system 702. For example, determining whether to stop may include comparing the list of record items with the inventory items to determine whether a suitable number of inventory items have been identified. In some examples, this determination may correspond to a confidence level and/or a confidence threshold, each of which may correspond to a fall-off curve. For example, as read time increases (i.e., the total time that a reader is interrogating tags), the number of identified tags over time may increase, level off, then begin to fall. Thus, even though the reader may continue to interrogate tags, the fall-off curve may indicate that it is going to take too much time (according to some standard) to identify any more tags. Thus, the reader may be instructed to stop interrogating tags and/or the mobile drive unit may be instructed to move the inventory holder away from the reading station. In some examples, the confidence level may increase each time the inventory holder is read. If the answer at 1116 is no, then the process 1100 returns to 1110 where tags are read. In some examples, the process 1100 may return to 1108 to instruct the mobile drive unit to move the inventory holder to a different position prior to reading tags at 1110. In this manner, the mobile drive unit may repeatedly move the inventory holder until a confidence level and/or threshold is reached, as discussed above with regards to block 1116.

If the answer at 1116 is yes, then the process 1100 continues to 1118. At 1118, the process 1100 instructs the mobile drive unit to move the inventory holder. In some examples, instructing the mobile drive unit to move the inventory holder may be performed by the management module 15. Instructing the mobile drive unit may include instructing the mobile drive unit to move the inventory holder away from the reading structure.

Figure 12:
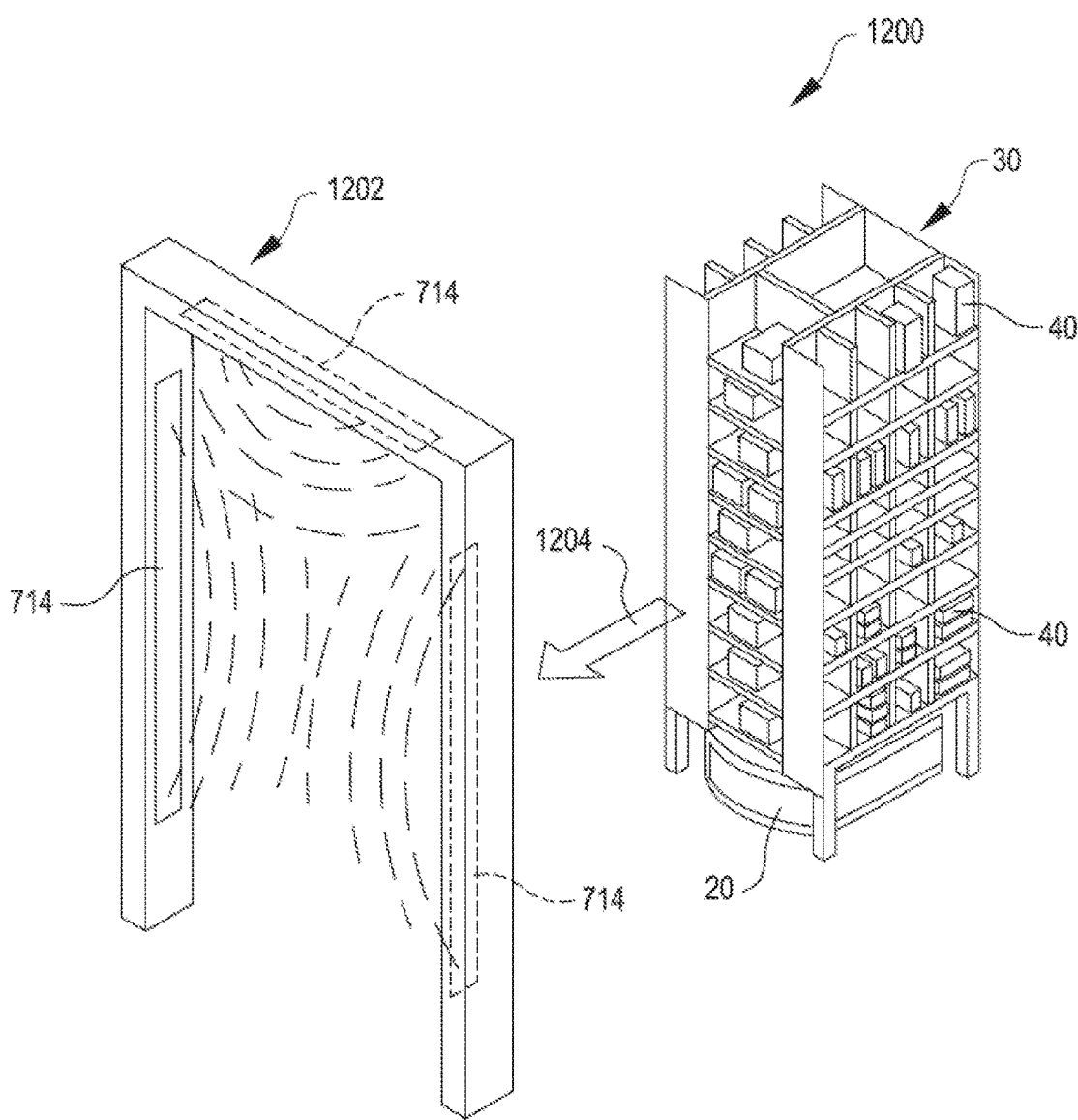
FIGS. 12-15 illustrate example reading structures for implementing techniques relating to managing inventory items using RFID tags as described herein, according to different embodiments.

FIG. 12 illustrates an example reading station 1200 for implementing techniques relating to managing inventory items using RFID tags as described herein. The reading station 1200 may include a u-shaped reading structure 1202 and may receive the inventory holder 30 within or near the reading structure 1202. The u-shaped reading structure 1202 may resemble a frame, such as a door frame. In some examples, the u-shaped reading structure 1202 may be integrated into an existing wall, existing door frame, or the like in the workspace 70. The u-shaped reading structure 1202 may be constructed of any suitable material having rigid and/or semi-rigid properties (e.g., metal, wood, plastic, or the like). On each of the three walls of the u-shaped reading structure 1202 may be attached the antennas 714. In some examples, one or more antennas 714 may be attached on each wall. While the antennas 714 are illustrated as having a particular shape, it is understood that any suitable shape and/or type of antenna may be used in connection with the u-shaped reading structure 1202 (and any other reading structures discussed herein). For example, the antennas 714 of the u-shaped reading structure 1202 may be coaxial cable antennas attached to, or partially imbedded in, the walls of the u-shaped reading structure. In some examples, the antennas 714 may transmit RF energy towards the middle of the u-shaped reading structure 1202. In order to implement the techniques described herein, the mobile drive unit 20 may move the inventory holder 30 in the direction of arrow 1204 from a first position (as illustrated) to a second position within the u-shaped reading structure 1202 or beyond the u-shaped reading structure 1202. In some examples, the mobile drive unit 20 may cause the inventory holder 30 to rotate while the inventory holder 30 is within the u-shaped reading structure 1202. Such movement and/or rotation may increase the read rates of RFID tags attached to inventory items within the inventory holder 30. In some examples, the u-shaped reading structure 1202 may be implemented to read an inventory holder RFID tag associated with the inventory holder 30 prior to or substantially simultaneously with reading the RFID tags attached to the inventory items within the inventory holder 30. For example, the u-shaped reading structure 1202 may be located at the door of the reading station 1200, and the u-shaped reading structure 1202 may be used to read the inventory holder RFID tag, while other reading structures, including other antennas, may be used to read the RFID tags 106.

Figure 13:
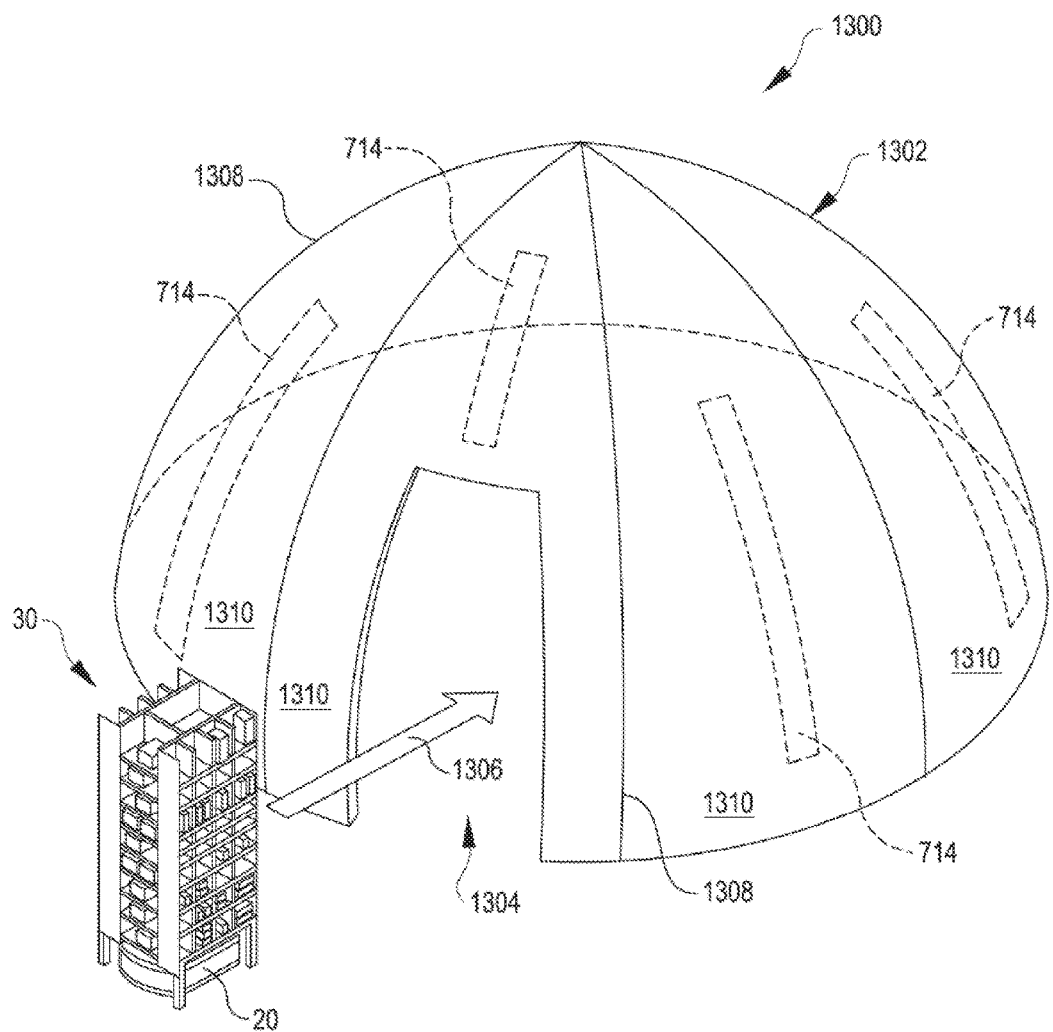

FIG. 13 illustrates an example reading station 1300 for implementing techniques relating to managing inventory items using RFID tags as described herein. The reading station 1300 may include a dome reading structure 1302 and may receive the inventory holder 30 within the dome reading structure 1302. The dome reading structure 1302 may include an opening 1304, a frame 1308, and one or more antennas 714 mounted within the reading structure 1302. The opening 1304 may also include a door (not shown) to close the opening 1304. In some examples, the antennas 714 may be attached to the frame 1308. In some examples, the frame 1308 may be a support structure for the dome reading structure 1302. Between individual members of the frame 1308 may be disposed a plurality of panels 1310. The frame 1308 of the dome reading structure 1302 may be constructed of any suitable rigid or semi-rigid material (e.g., metal, wood, plastic, or the like). In some examples, the panels 1310 of the dome reading structure 1302 may be constructed of a material that can reflect RF energy, whether rigid or semi-rigid. In some examples, the interiors of the panels 1310 of the dome reading structure 1302 may be lined with a similar material or a material having similar properties. In this manner, RF energy transmitted by the antennas 714 within the dome reading structure 1302 may be reflected and may more likely come into contact with the inventory holder 30. In some examples, the dome reading structure 1302 may enable the reader system 102 to more quickly read the RFID tags 106 because a greater amount of RF energy may be present within the dome reading structure 1302. In some examples, the dome reading structure 1302 may be designed to have parabolic characteristics. For example, the dome reading structure 1302 may be characterized as a parabola opening down and rotated about its axis of symmetry. Thus, the dome reading structure 1302 may have a focal point on its inside to which RF energy may be directed and concentrated. In order to implement the techniques described herein, the mobile drive unit 20 may move the inventory holder 30 in the direction of arrow 1306 from a first position (as illustrated) to a second position within the dome reading structure 1302. This may involve moving the inventory holder 30 through the opening 1304. Once within the dome reading structure 1302, the mobile drive unit 20 may move the inventory holder to the second position. In some examples, the second position may correspond to the focal point. Once within the dome reading structure 1302, the mobile drive unit 20 may rotate or otherwise adjust the direction of travel of the inventory holder 30 in accordance with techniques described herein. In some examples, the dome reading structure 1302 may include more than one opening 1304. Such additional openings may enable the mobile drive unit 20 to enter and exit the dome reading structure 1302 via different doorways. The dome reading structure 1302 may be configured to receive the inventory holder 30 coupled to the mobile drive unit 20 and other inventory holders coupled to other mobile drive units at the same time. For example, when the dome reading structure 1302 includes two or more doors, two or more mobile drive units 20 may move two or more inventory holders 30 through the different doors and into the dome reading structure 1302. In some examples, a first mobile drive 20 may move a first inventory holder 30 into the dome reading structure 1302. A second mobile drive unit 20 may move a second inventory holder 30 into the dome reading structure 1302 while the first inventory holder 30 is located within the dome reading structure 1302. In some examples, the mobile drive unit 20 may move a first inventory holder 30 into the dome reading structure 1302, decouple the first inventory holder 30, retrieve a second inventory holder 30, and move the second inventory holder 30 into the dome reading structure 1302. In some examples, inventory items stowed in both the first and second inventory holders 30 may be read simultaneously or at different times while located within the dome reading structure 1302. Thus, more than one inventory holder 30 may be located within the dome reading structure 1302 at any one time.

Figure 14:
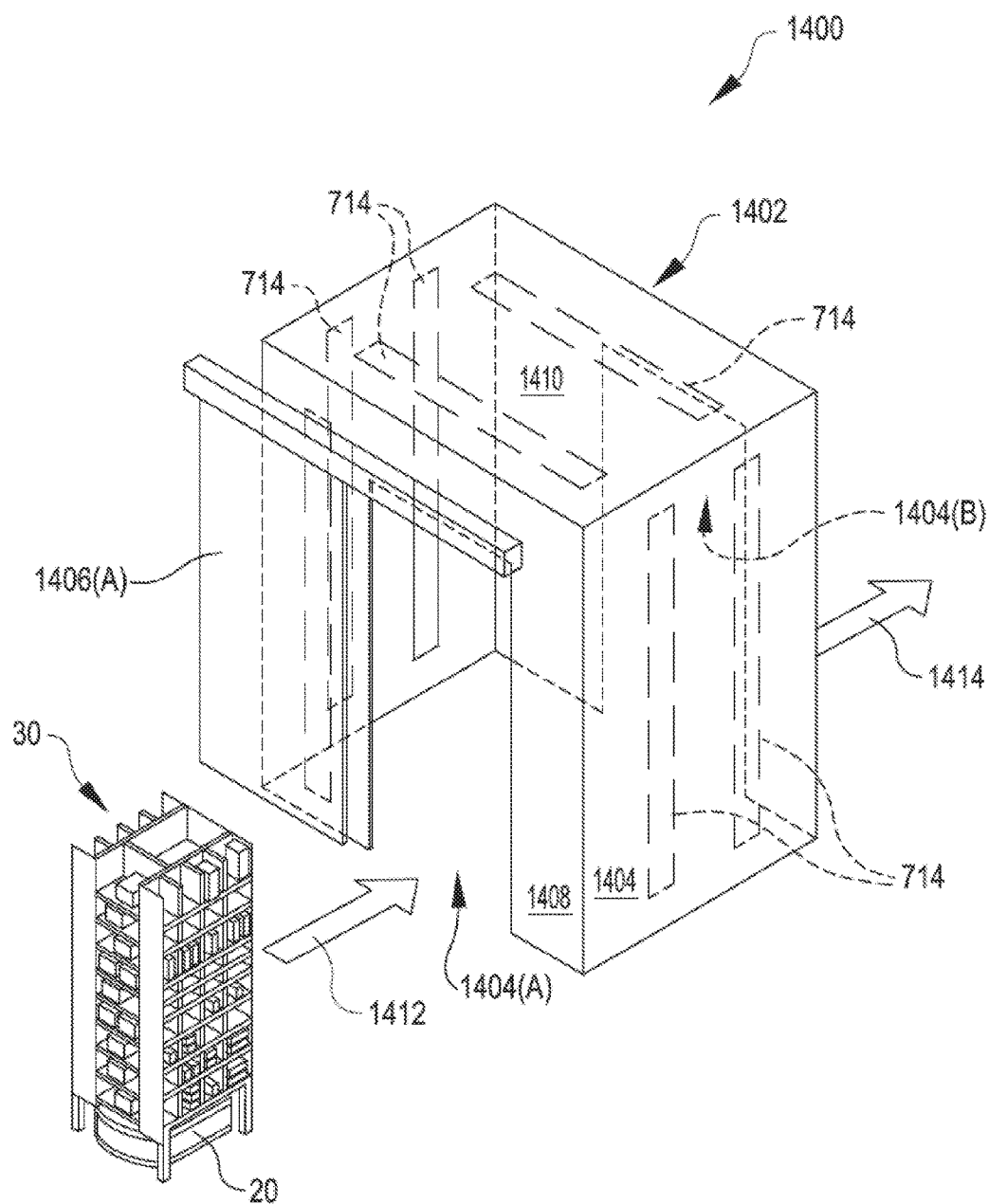

FIG. 14 illustrates an example reading station 1400 for implementing techniques relating to managing inventory items using RFID tags as described herein. The reading station 1400 may be characterized as including the inventory holder 30 and a box reading structure 1402. The box reading structure 1402 may have a box shape, including a frame (not shown), four walls 1408, and a ceiling 1410. The frame, walls 1408, and ceiling 1410 may be constructed of any suitable rigid or semi-rigid material (e.g., metal, wood, plastic, or the like). In some examples, two of the four walls 1408 may include openings, 1404(A), 1404(B). In some embodiments, any number of walls 1408 may include openings. The interior of the box reading structure 1402 may be lined with one or more antennas 714. In some examples, the interior of the box reading structure 1402 may be lined with a material capable of reflecting RF energy. In this manner, a greater amount of RF energy may be transmitted in the direction of the inventory holder 30. The openings 1404(A), 1404(B) may be closeable using two opposite-facing doors 1406. For clarity, only one door 1406(A) is illustrated in FIG. 14. The doors 1406 may be configured to slide, swing, or otherwise close the box reading structure 1402. In order to implement the techniques described herein, the mobile drive unit 20 may move the inventory holder 30 in the direction of arrow 1412 from a first position (as illustrated) to a second position within the box reading structure 1402. Once within the box reading structure 1402, the doors 1406 may close and the RFID tags 106 attached to the inventory items 40 within the inventory holder 30 may be read by the reader system 102. Once within the box reading structure 1402, the mobile drive unit 20 may rotate or otherwise adjust the direction of travel of the inventory holder 30 in accordance with techniques described herein. After it is determined that the reading should stop or that the mobile drive unit 20 should otherwise move the inventory holder 30, the mobile drive unit 20 may move the inventory holder 30 in the direction of arrow 1414 out of the box reading structure 1402. The box reading structure 1402 may be configured to receive the inventory holder 30 coupled to the mobile drive unit 20 and other inventory holders coupled to other mobile drive units at the same time. For example, a first mobile drive 20 may move a first inventory holder 30 into the box reading structure 1402. A second mobile drive unit 20 may move a second inventory holder 30 into the box reading structure 1402 while the first inventory holder 30 is located within the box reading structure 1402. In some examples, the mobile drive unit 20 may move a first inventory holder 30 into the box reading structure 1402, decouple the first inventory holder 30, retrieve a second inventory holder 30, and move the second inventory holder 30 into the box reading structure 1402. In some examples, inventory items stowed in both the first and second inventory holders 30 may be read simultaneously or at different times while located within the box reading structure 1402. Thus, more than one inventory holder 30 may be located within the box reading structure 1402 at any one time.

Figure 15:
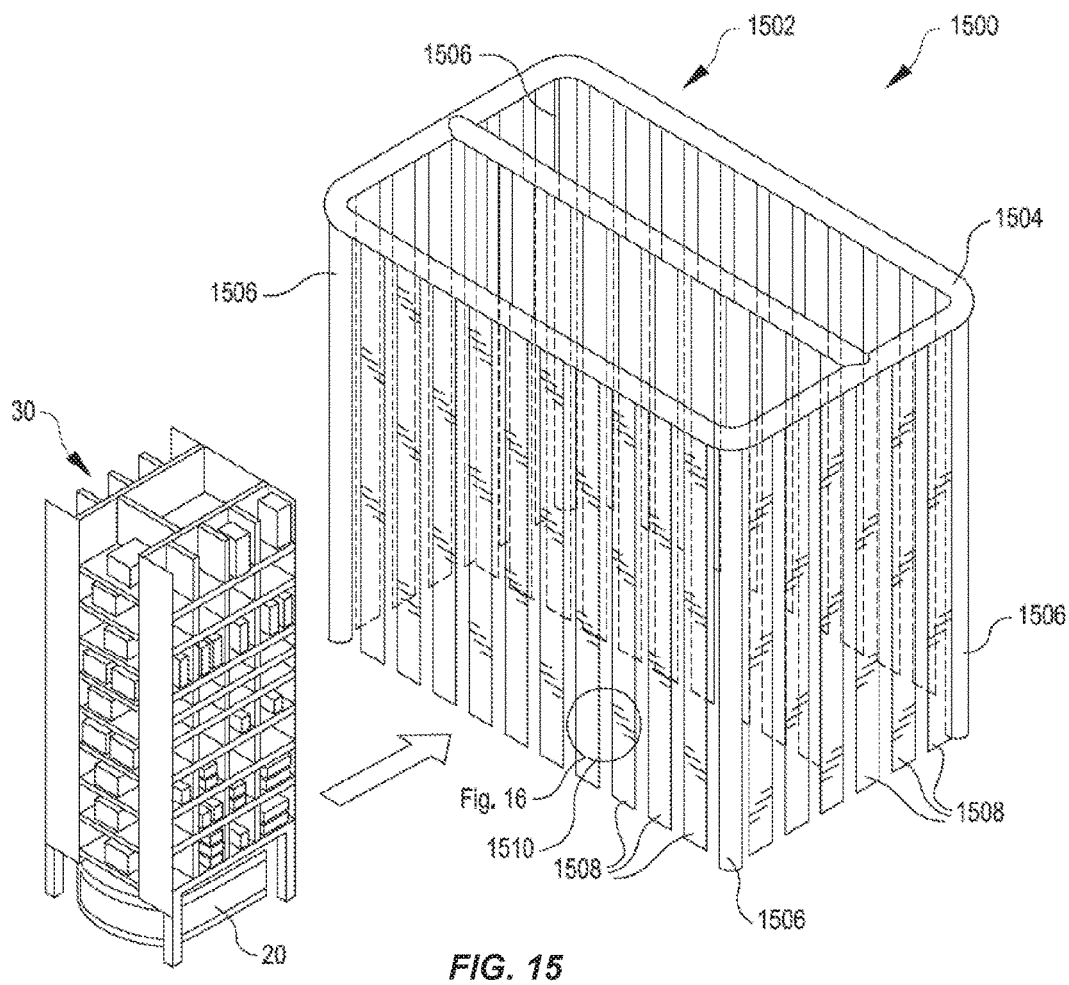

FIG. 15 illustrates an example reading station 1500 for implementing techniques relating to managing inventory items using RFID tags as described herein. The reading station 1500 may be characterized as including the inventory holder 30 and a flexible member structure 1502. The flexible member structure 1502 may include a frame 1504 and one or more legs 1506 extending from the frame 1504 in the direction of a surface on which the legs 1506 rest. Thus, the frame 1504 may be located above the surface and the legs 1506 may extend below the frame 1504. The frame 1504 and/or the legs 1506 may be constructed of any suitable rigid or semi-rigid material (e.g., metal, wood, plastic, or the like). A plurality of flexible members 1508 may be attached to the frame 1504 and may extend in the direction of the surface. As illustrated in more detail in FIG. 16, the flexible members 1508 may include the antennas 714 disposed therein. The flexible members 1508 may be constructed of any suitable flexible material (e.g. plastic, etc.). In some examples, the flexible members 1508 may be arranged in layers or sheets or a field. In some examples, the flexible members 1508 may be arranged randomly, semi-randomly, or in some order (e.g., in layers or sheets). For example, the arrangement of the flexible members 1508 may resemble a sea anemone. In any arrangement, the flexible members 1508 may give way as an object (e.g., the inventory holder 30) moves through the flexible members 1508. In order to implement the techniques described herein, the inventory holder 30 may move through the flexible member structure 1502 and the antennas 714 (illustrated in FIG. 16) within the flexible members 1508. The antennas 714 may then read the RFID tags 106 attached to the inventory items 40 within the inventory holder 30. In some examples, when the inventory holder 30 is under the frame 1504 and within flexible members 1508 at least three sides of the inventory holder 30 may be exposed to the flexible members 1508. For example, the flexible members 1508 may be characterized as a field of flexible members 1508, and as the inventory holder 30 enters the field of flexible members 1508, the leading side of the inventory holder 30 may first be exposed to the flexible members 1508. Next, as the inventory holder 30 continues into the field of flexible members 1508, the two sides sharing edges with the leading side of the inventory holder 30 may be exposed to the flexible members 1508. Finally, the trailing side of the inventory holder 30 may be located within the field of flexible members 1508 and may therefore be exposed to the flexible members 1508. In some examples, the RFID tags 106 may be read while the inventory holder 30 is located within the flexible members 1508 without rotation and/or additional movement. In some examples, the inventory holder 30 may be moved or rotated within the flexible members 1508 by the mobile drive unit 20, a human worker, a conveyor belt, a moving walkway, or any other suitable mechanism for moving the inventory holder 30 relative to the flexible members 1508.

Figure 16:
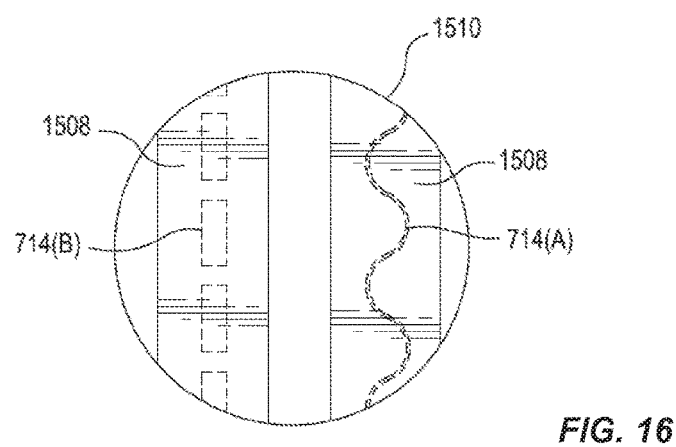
FIG. 16 illustrates a zoomed-in area from FIG. 15 showing flexible members for implementing techniques relating to managing inventory items using RFID tags as described herein, according to at least one embodiment.

FIG. 16 illustrates a zoomed-in view 1510 showing two flexible members 1508 from the FIG. 6. Within the zoomed-in view 1510, two antennas 714(A) and 714(B) are illustrated. In some examples, the antenna 714(A) may be a flexible coaxial cable antenna. Such a coaxial cable antenna may be included within each of the flexible members 1508 and, like the other antennas 714 discussed herein, may be in included as part of the reader system 102. In some examples, the coaxial cable antennas may be embedded within each or some of the flexible members 1508. In some examples, the antennas 714(B) may be a variety of antenna capable of being included within the flexible members 1508. In some examples, more than one of the antennas 714(B) may be included in each of the flexible members 1508.

Figure 17:
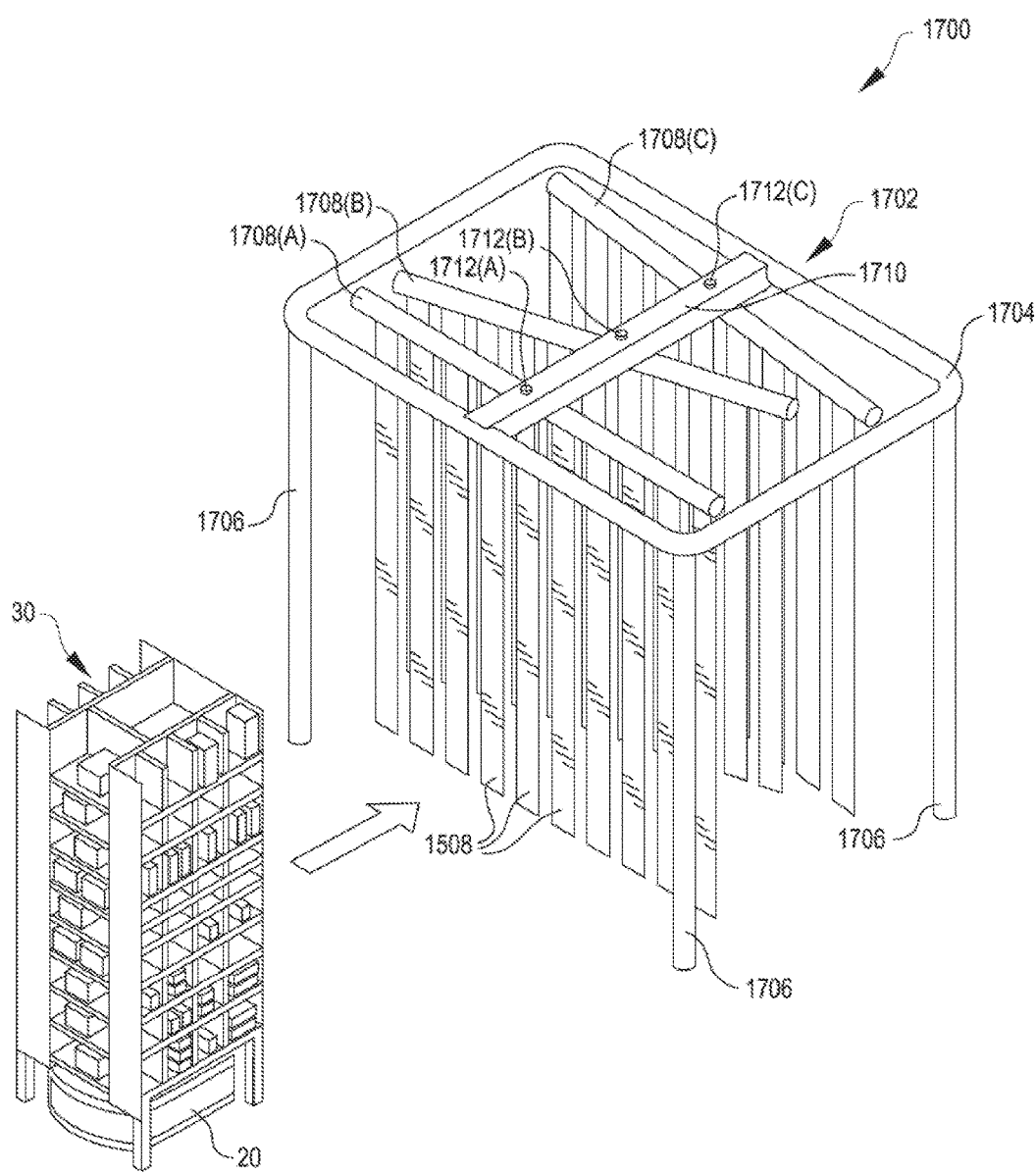
FIG. 17 illustrates an example reading structure for implementing techniques relating to managing inventory items using RFID tags as described herein, according to at least one embodiment.

FIG. 17 illustrates an example reading station 1700 for implementing techniques relating to managing inventory items using RFID tags as described herein. The reading station 1700 may be characterized as including the inventory holder 30 and a flexible member structure 1702. The flexible member structure 1702 may include a frame 1704 and one or more legs 1706 extending from the frame 1704 in the direction of a surface on which the legs 1706 rest. Thus, the frame 1704 may be located above the surface and the legs 1706 may extend below the frame 1704. The frame 1704 and/or the legs 1706 may be constructed of any suitable rigid or semi-rigid material (e.g., metal, wood, plastic, or the like). Similar to FIG. 15, the flexible members 1508 may be attached to the frame 1704 and extend in the direction of the surface. The flexible members 1508 may include the antennas 714 disposed therein. The frame 1704 may include support structure 1710. In some examples, the support structure 1710 may include one or more mounting locations 1712(A)-1712(C). The mounting locations 1712(A)-1712(C) may be any suitable structures, devices, or mechanisms to enable connection of support members 1708(A)-1708(C) to the support structure 1710. In some examples, the mounting locations 1712 may include a bearing, a rod, a bolt, or other structure to enable the support members 1708 to be rotationally held at the mounting locations 1712. Thus, each of the support members 1708 may be movably attached to the mounting locations 1712 to enable at least rotation about each of the mounting locations 1712. In some examples, a device or mechanism may be provided to cause the support members 1708 (and their corresponding flexible members 1508) to rotate, translate, swing, or oscillate about the mounting locations 1712. In some examples, the support members 1708 are configured to swing back and forth relative to each other. In some examples, a similar device or mechanism or a different device or mechanism may be provide to cause the support members 1708 to swing back and forth relative to one another. Such movement of the support members 1708, whether or not induced by a mechanism, may also include movement and rotation in three dimensions (e.g., side-to-side, front-to-back, and up-and-down). The support members 1708 may hold the flexible members 1508 in a sheet configuration. Similar to the example reading station 1500, the inventory holder 30 may be moved in the direction of the flexible member structure 1702 and into the sheets of flexible members 1508. As the inventory holder 30 enters the sheets of flexible members 1508, the sheets of flexible members may move side-to-side and may also rotate. In this manner, the different sides of the inventory holder 30 may be exposed to the antennas 714 held within the flexible members 1508. Similar to FIG. 15, in some examples, the inventory holder 30 may additionally or alternatively be moved or rotated within the flexible members 1508 by the mobile drive unit 20, a human worker, a conveyor belt, a moving walkway, or any other suitable mechanism for moving the inventory holder 30 relative to the flexible members 1508.

Figure 18:
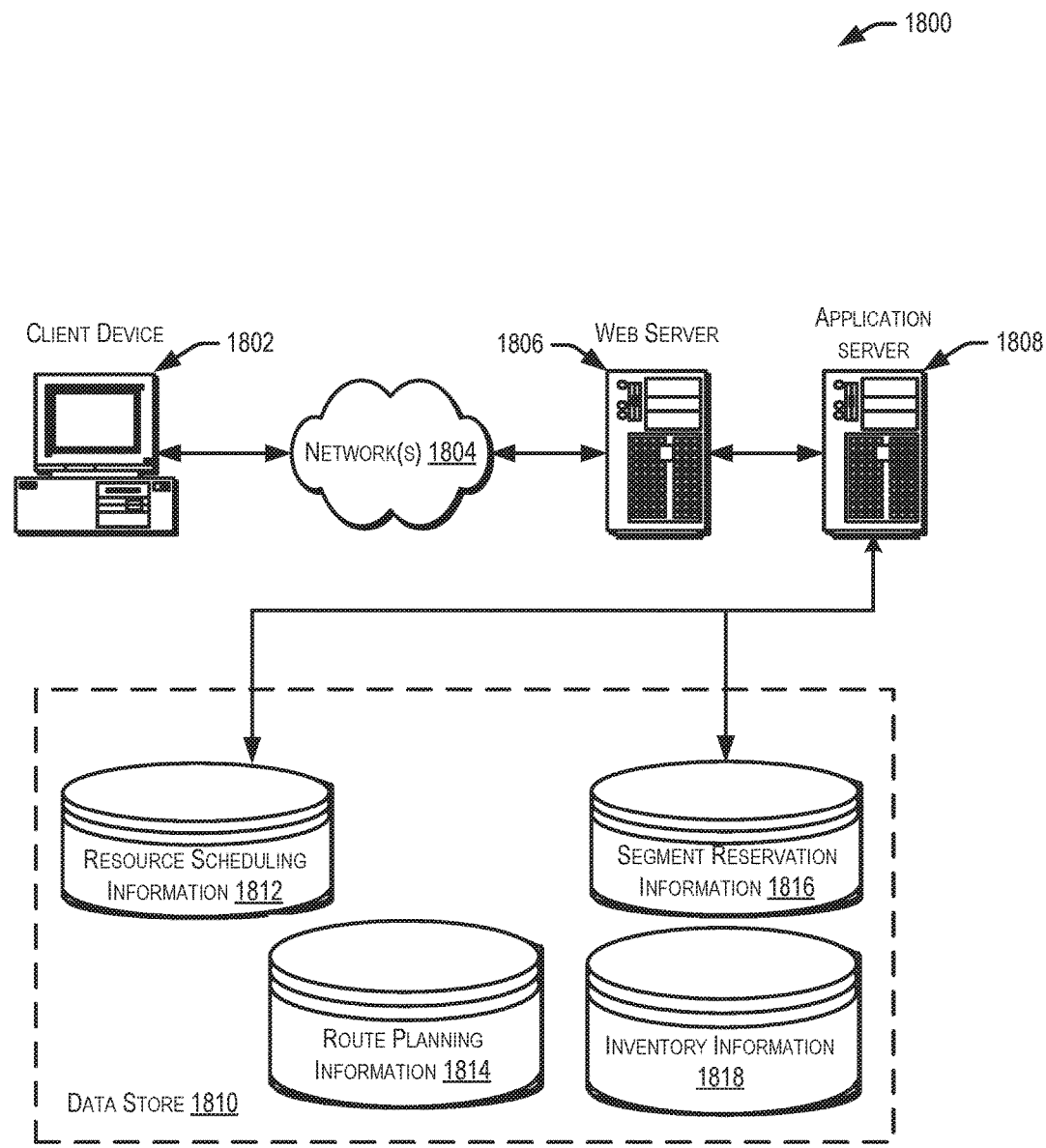
FIG. 18 illustrates an environment in which various features of the inventory system can be implemented, according to at least one embodiment.

FIG. 18 illustrates aspects of an example environment 1800 for implementing aspects in accordance with various embodiments. As will be appreciated, although a Web-based environment is used for purposes of explanation, different environments may be used, as appropriate, to implement various embodiments. The environment includes an electronic client device 1802, which can include any appropriate device operable to send and receive requests, messages, or information over an appropriate network 1804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1802 and the application server 1808, can be handled by the Web server. It should be understood that the Web and application servers are not required and are merely example components, as structured code discussed herein can be executed on any appropriate device or host machine as discussed elsewhere herein.

The data store 1810 can include several separate data tables, databases or other data storage mechanisms and media for storing data relating to a particular aspect. For example, the data store illustrated includes mechanisms for storing information which can be used by modules described herein, such as resource scheduling information 1812, route planning information 1814, segment reservation information 1816, and/or inventory information 1818. It should be understood that there can be many other aspects that may need to be stored in the data store, such as for page image information and to access right information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the description herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the description.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®° and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the description and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the description as set forth in the claims.

Other variations are within the spirit of the present description. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this description are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   instructing a mobile drive unit to move a holder to a first position relative a reading structure, the holder detachably coupled to the mobile drive unit and including a plurality of items stowed in the holder;
   initiating an antenna attached to the reading structure;
   reading, via the antenna, a first identifying tag associated with a first item when the mobile drive unit and the holder are located at the first position, the first item stowed in the holder;
   responsive to reading the first identifying tag, instructing the mobile drive unit to move the holder to a second position relative to the antenna; and
   reading, via the antenna, a second identifying tag associated with a second item when the mobile drive unit and the holder are located at the second position, the second item stowed in the holder.

2. The computer-implemented method of claim 1, further comprising reading, via the antenna, a third identifying tag associated with a third item while the holder is being moved by the mobile drive unit from the first position to the second position.

3. The computer-implemented method of claim 1, wherein the reading structure comprises an enclosed structure and the antenna is located within the enclosed structure.

4. The computer-implemented method of claim 1, wherein the first identifying tag comprises a first unique identifying tag attached to and uniquely identifying the first item and the second identifying tag comprises a second unique identifying tag attached to and uniquely identifying the second item.

5. A system, comprising:
   a reading structure configured to receive a holder detachably coupled to a mobile drive unit;
   an antenna attached to the reading structure, the antenna aligned in a first direction, the mobile drive unit configured to move the inventory holder relative to the antenna; and a reader system in communication with the antenna and configured to read, via the antenna, tags associated with items stowed in the holder at least while the mobile drive unit moves the holder relative to the antenna.

6. The system of claim 5, wherein the reading structure comprises two rigid structures extending up from a surface and spaced apart such that the mobile drive unit can move the holder between the two rigid structures.

7. The system of claim 6, wherein the antenna is attached to a first rigid structure of the two rigid structures.

8. The system of claim 5, wherein the reader system is configured to:
read a first tag associated with a first item when the holder is located at a first position relative to the antenna; and
read a second tag associated with a second item when the holder is located at a second position relative to the antenna, the inventory holder aligned differently with respect to the antenna when in the first position compared to the second position.

9. The system of claim 8, wherein the holder comprises four sides, at least two sides of the four sides comprising one or more compartments, the first item being stowed in a first compartment of a first side of the four sides and the second item being stowed in a second compartment of a second side of the four sides, the first side and the second side being separated by a corner of the inventory holder.

10. The system of claim 5, wherein the antenna is a first antenna, the system further comprising a second antenna aligned in a second direction, the first direction different from the second direction.

11. The system of claim 5, wherein the reading structure comprises an enclosed structure including at least one opening sized to receive the holder, and the antenna is located inside the enclosed structure.

12. The system of claim 11, wherein the enclosed structure comprises at least one of a dome structure or a box structure.

13. The system claim 5, wherein the tags comprise radio-frequency identification tags.

14. The system of claim 5, wherein:
the antenna is a first antenna that is attached to the reading structure at a first location; and
the system further comprises a second antenna aligned in a second direction and attached to the reading structure at a second location.

15. A system, comprising:
a frame comprising a plurality of flexible members hanging from the frame, extending below the frame, and being held above a surface by the frame, individual flexible members of the plurality of flexible members comprising antennas configured to communicate with identifying tags, wherein the frame and the plurality of flexible members are configured to receive a holder at a first position on the surface at least partially situated within a first portion of the plurality of flexible members; and
a reader system in communication with at least a portion of the antennas and configured to read an identifying tag to identify an item stowed in the holder at least when the holder is at the first position.

16. The system of claim 15, wherein the holder is detachably coupled to a mobile drive unit and the mobile drive unit is configured to move the holder to the first position and move the holder to a second position on the surface at least partially situated within a second portion of the plurality of flexible members.

17. The system of claim 15, wherein the antennas comprise coaxial cable antennas disposed within or on the plurality of flexible members.

18. The system of claim 15, wherein the plurality of flexible members are configured according to an arrangement comprising two or more layers running substantially parallel to each other.

19. The system of claim 15, further comprising one or more support members movably coupled to the frame, the plurality of flexible members attached to the one or more support members.

20. The system of claim 19, wherein:
the one or more support members are configured to cause movement of the plurality of flexible members; and
the reader system is configured to read the identifying tag to identify the item stowed in the holder at least during the movement of the plurality of flexible members.

* * * * *

UNITED STATES PATENT AND TRADEMARK OFFICE
CERTIFICATE OF CORRECTION

PATENT NO. : 9,613,338 B1  
APPLICATION NO. : 15/181360  
DATED : April 4, 2017  
INVENTOR(S) : Ryan Scott Russell et al.

Page 1 of 1

It is certified that error appears in the above-identified patent and that said Letters Patent is hereby corrected as shown below:

Claim 13, in Column 39, Line 38:  
Please delete "The system claim"  
And insert -- The system of claim --

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*